US012160705B2

(12) United States Patent
Tang et al.

(10) Patent No.: US 12,160,705 B2
(45) Date of Patent: Dec. 3, 2024

(54) SYSTEMS AND METHODS FOR DETECTING STATE OF BONE CONDUCTION HEARING DEVICE

(71) Applicant: SHENZHEN SHOKZ CO., LTD., Guangdong (CN)

(72) Inventors: Huifang Tang, Shenzhen (CN); Bocheng Li, Shenzhen (CN); Bingyan Yan, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 187 days.

(21) Appl. No.: 17/935,123

(22) Filed: Sep. 25, 2022

(65) Prior Publication Data

US 2023/0011909 A1 Jan. 12, 2023

Related U.S. Application Data

(63) Continuation of application No. PCT/CN2020/112328, filed on Aug. 29, 2020.

(51) Int. Cl.
*H04R 25/00* (2006.01)

(52) U.S. Cl.
CPC ....... *H04R 25/305* (2013.01); *H04R 2460/13* (2013.01)

(58) Field of Classification Search
None
See application file for complete search history.

(56) References Cited

U.S. PATENT DOCUMENTS

2006/0222195 A1 10/2006 Bramslow
2010/0074451 A1 3/2010 Usher et al.
(Continued)

FOREIGN PATENT DOCUMENTS

CN 110972014 A 4/2020
EP 1322138 A2 6/2003
(Continued)

OTHER PUBLICATIONS

Notice of Reasons for Rejection in Japanese Application No. 2022-568470 mailed on Dec. 25, 2023, 15 pages.
(Continued)

*Primary Examiner* — Mark Fischer
(74) *Attorney, Agent, or Firm* — METIS IP LLC

(57) ABSTRACT

The present disclosure provides methods and systems for detecting the state of a bone conduction hearing device. The bone conduction hearing device comprises at least a microphone, a speaker, a feedback analysis unit, and a signal processing unit. The speaker may generate a third sound based on a first signal, wherein the first signal may be generated by the signal processing unit. The microphone may receive the third sound and generate a feedback signal. The feedback analysis unit may determine a feedback path transfer function from the speaker to the microphone based on the feedback signal and the first signal, obtain at least one preset feedback path transfer function, and compare the feedback path transfer function and the at least one preset feedback path transfer function. The signal processing unit may determine the state of the bone conduction hearing device based on a comparison result.

16 Claims, 10 Drawing Sheets

(56) References Cited

U.S. PATENT DOCUMENTS

| | | | | |
|---|---|---|---|---|
| 2012/0114157 | A1 | 5/2012 | Arndt et al. | |
| 2012/0288107 | A1 | 11/2012 | Lamm et al. | |
| 2013/0070935 | A1* | 3/2013 | Hui | H04R 3/005 381/71.1 |
| 2014/0270206 | A1 | 9/2014 | Port | |
| 2014/0321682 | A1 | 10/2014 | Kofod-Hansen et al. | |
| 2015/0124977 | A1 | 5/2015 | Srivastava et al. | |
| 2017/0070826 | A1 | 3/2017 | Pedersen et al. | |
| 2019/0075403 | A1* | 3/2019 | Wurzbacher | H04R 25/30 |
| 2019/0189129 | A1 | 6/2019 | Arakawa et al. | |
| 2019/0327563 | A1 | 10/2019 | King et al. | |
| 2020/0359146 | A1* | 11/2020 | Klinke | H04R 29/004 |

FOREIGN PATENT DOCUMENTS

| | | | |
|---|---|---|---|
| EP | 1467595 | A2 | 10/2004 |
| EP | 2071873 | A1 | 6/2009 |
| EP | 3675526 | A1 | 7/2020 |
| EP | 3675526 | B1 | 7/2021 |
| JP | 2020115636 | A | 7/2020 |
| WO | 2015069416 | A1 | 5/2015 |

OTHER PUBLICATIONS

Office Action in Russian Application No. 2022125994 mailed on Apr. 28, 2023, 20 pages.
The Extended European Search Report in European Application No. 20950837.3 mailed on Jun. 6, 2023, 10 pages.
International Search Report in PCT/CN2020/112328 mailed on May 31, 2021, 6 pages.
Written Opinion in PCT/CN2020/112328 mailed on May 31, 2021, 7 pages.
First Office Action in Chinese Application No. 202010891027.X mailed on Apr. 6, 2021, 19 pages.

* cited by examiner

200

SYSTEMS AND METHODS FOR DETECTING STATE OF BONE CONDUCTION HEARING DEVICE

CROSS-REFERENCE TO RELATED APPLICATIONS

This application is a continuation of International Patent Application No. PCT/CN2020/112328, filed on Aug. 29, 2020, the contents of which are hereby incorporated by reference.

TECHNICAL FIELD

The present disclosure generally relates to a technical field of hearing devices, in particular, to systems and methods for detecting the state of a bone conduction hearing device.

BACKGROUND

A hearing device (such as a hearing aid) usually has both a microphone and a speaker. The state of the hearing device may greatly affect the usage of the hearing device. The abnormal state of the hearing device may cause the output sensitivity of the hearing device to be significantly reduced or may directly cause malfunction of the hearing device (for example, a howlround may occur). Therefore, the detection of the state of the hearing device is of great significance to ensure the normal use of the hearing device and to reduce the damage that may be brought by the abnormal hearing device. In a bone conduction hearing device (such as a bone conduction hearing aid), a feedback path transfer function is an important indicator that reflects the state of the hearing device. In some scenarios, the real-time state of the bone conduction hearing device may be intuitively reflected by detecting and evaluating the feedback path transfer function of the bone conduction hearing device.

SUMMARY

One of the embodiments of the present disclosure provides a method for detecting the state of a bone conduction hearing device, wherein the bone conduction hearing device comprises at least a microphone, a speaker, a feedback analysis unit, and a signal processing unit. The method comprises: generating, by the speaker, a third sound based on a first signal, wherein the first signal is generated by the signal processing unit; by the microphone, receiving the third sound and generating a feedback signal; by the feedback analysis unit, determining a feedback path transfer function from the speaker to the microphone based on the feedback signal and the first signal, obtaining at least one preset feedback path transfer function, and comparing the feedback path transfer function with the at least one preset feedback path transfer function; and determining, by the signal processing unit, the state of the bone conduction hearing device based on a comparison result.

In some embodiments, the at least one preset feedback path transfer function includes a standard feedback path transfer function and an abnormal feedback path transfer function, the abnormal feedback path transfer function includes one or more of an incorrect wearing feedback path transfer function, an abnormal structure feedback path transfer function, a foreign body intrusion feedback path transfer function, and a foreign body blocking feedback path transfer function. The comparing the feedback path transfer function with the at least one preset feedback path transfer function comprises: determining at least one preset feedback path transfer function within a preset threshold range with the feedback path transfer function; and determining a type of the feedback path transfer function based on a type of the at least one determined preset feedback path transfer function.

In some embodiments, the determining a type of the feedback path transfer function based on a type of the at least one determined preset feedback path transfer function comprises: if the type of the at least one determined preset feedback path transfer function is the standard feedback path transfer function, determining that the feedback path transfer function is a normal feedback path transfer function; or if the type of the at least one determined preset feedback path transfer function is the abnormal feedback path transfer function, determining that the feedback path transfer function is an abnormal feedback path transfer function; and the method further comprises: if the type of the at least one determined preset feedback path transfer function is the incorrect wearing feedback path transfer function, determining that the feedback path transfer function is an incorrect wearing feedback path transfer function; or if the type of the at least one determined preset feedback path transfer function is the abnormal structure feedback path transfer function, determining that the feedback path transfer function is an abnormal structure feedback path transfer function; or if the type of the at least one determined preset feedback path transfer function is the foreign body intrusion feedback path transfer function, determining that the feedback path transfer function is a foreign body intrusion feedback path transfer function; or if the type of the at least one determined preset feedback path transfer function is the foreign body blocking feedback path transfer function, determining that the feedback path transfer function is a foreign body blocking feedback path transfer function.

In some embodiments, the determining at least one preset feedback path transfer function within a preset threshold range with the feedback path transfer function comprises: if the count of the at least one determined preset feedback path transfer function is two or more than two, determining the preset feedback path transfer function with the smallest difference as one determined preset feedback path transfer function.

In some embodiments, the determining the state of the bone conduction hearing device based on a comparison result comprises: if the feedback path transfer function is a normal feedback path transfer function, determining that the state of the bone conduction hearing device is normal; or if the feedback path transfer function is an abnormal feedback path transfer function, determining that the state of the bone conduction hearing device is abnormal, and the method further comprises determining an abnormal type of the bone conduction hearing device by: if the feedback path transfer function is an incorrect wearing feedback path transfer function, determining that the bone conduction hearing device is in an incorrect wearing state; or if the feedback path transfer function is an abnormal structure feedback path transfer function, determining that the bone conduction hearing device is in an abnormal structure state; or if the feedback path transfer function is a foreign body intrusion feedback path transfer function, determining that the bone conduction hearing device is in a foreign body intrusion state; or if the feedback path transfer function is a foreign body blocking feedback path transfer function, determining that the bone conduction hearing device is in a foreign body blocking state.

In some embodiments, the method further comprises: adaptively adjusting one or more parameters of the bone conduction hearing device or sending reminder information to a user based on the state of the bone conduction hearing device.

In some embodiments, the state of the bone conduction hearing device includes a normal state and an abnormal state; and the abnormal state includes one or more of an incorrect wearing state, an abnormal structure state, a foreign body intrusion state, and a foreign body blocking state.

One of the embodiments of the present disclosure provides a system for detecting the state of a bone conduction hearing device, wherein the bone conduction hearing device comprises at least a microphone, a speaker, a feedback analysis unit, and a signal processing unit, and the system comprises: the speaker configured to generate a third sound based on a first signal, wherein the first signal is generated by the signal processing unit; the microphone configured to receive the third sound and generate a feedback signal; the feedback analysis unit configured to determine a feedback path transfer function from the speaker to the microphone based on the feedback signal and the first signal, obtaining at least one preset feedback path transfer function, and comparing the feedback path transfer function with the at least one preset feedback path transfer function; and the signal processing unit configured to determine the state of the bone conduction hearing device based on a comparison result.

In some embodiments, the at least one preset feedback path transfer function includes a standard feedback path transfer function and an abnormal feedback path transfer function, the abnormal feedback path transfer function includes one or more of an incorrect wearing feedback path transmission function, an abnormal structure feedback path transfer function, a foreign body intrusion feedback path transfer function, and a foreign body blocking feedback path transfer function; the comparing the feedback path transfer function with the at least one preset feedback path transfer function comprises: determining at least one preset feedback path transfer function within a preset threshold range with the feedback path transfer function; and determining a type of the feedback path transfer function based on a type of the at least one determined preset feedback path transfer function.

In some embodiments, the determining a type of the feedback path transfer function based on a type of the at least one determined preset feedback path transfer function comprises: if the type of the at least one determined preset feedback path transfer function is the standard feedback path transfer function, determining that the feedback path transfer function is a normal feedback path transfer function; or if the type of the at least one determined preset feedback path transfer function is the abnormal feedback path transfer function, determining that the feedback path transfer function is an abnormal feedback path transfer function; and the determining a type of the feedback path transfer function further comprises: if the type of the at least one determined preset feedback path transfer function is the incorrect wearing feedback path transfer function, determining that the feedback path transfer function is an incorrect wearing feedback path transfer function; or if the type of the at least one determined preset feedback path transfer function is the abnormal structure feedback path transfer function, determining that the feedback path transfer function is an abnormal structure feedback path transfer function; or if the type of the at least one determined preset feedback path transfer function is the foreign body intrusion feedback path transfer function, determining that the feedback path transfer function is a foreign body intrusion feedback path transfer function; or if the type of the at least one determined preset feedback path transfer function is the foreign body blocking feedback path transfer function, determining that the feedback path transfer function is a foreign body blocking feedback path transfer function.

In some embodiments, the determining at least one preset feedback path transfer function within a preset threshold range with the feedback path transfer function comprises: if the count of the at least one determined preset feedback path transfer function is two or more than two, determining the preset feedback path transfer function with the smallest difference as one determined preset feedback path transfer function.

In some embodiments, the determining the state of the bone conduction hearing device based on a comparison result comprises: if the feedback path transfer function is a normal feedback path transfer function, determining that the state of the bone conduction hearing device is normal; or if the feedback path transfer function is an abnormal feedback path transfer function, determining that the state of the bone conduction hearing device is abnormal; and the system further comprises determining an abnormal type of the bone conduction hearing device by: if the feedback path transfer function is an incorrect wearing feedback path transfer function, determining that the bone conduction hearing device is in an incorrect wearing state; or if the feedback path transfer function is an abnormal structure feedback path transfer function, determining that the bone conduction hearing device is in an abnormal structure state; or if the feedback path transfer function is a foreign body intrusion feedback path transfer function, determining that the bone conduction hearing device is in a foreign body intrusion state; or if the feedback path transfer function is a foreign body blocking feedback path transfer function, determining that the bone conduction hearing device is in a foreign body blocking state.

In some embodiments, the signal processing unit is configured to adaptively adjust one or more parameters of the bone conduction hearing device or send reminder information to a user based on the state of the bone conduction hearing device.

In some embodiments, the state of the bone conduction hearing device includes a normal state and an abnormal state; and the abnormal state includes one or more of an incorrect wearing state, an abnormal structure state, a foreign body intrusion state, and a foreign body blocking state.

One of the embodiments of the present disclosure provides a system for detecting the state of a bone conduction hearing device, wherein the system comprises a sound generation module, a feedback signal generation module, a feedback analysis module, and a signal processing module. The sound generation module is configured to generate a third sound based on a first signal, wherein the first signal is generated by a signal processing unit. The feedback signal generation module is configured to receive the third sound and generate a feedback signal. The feedback analysis module is configured to determine a feedback path transfer function from the speaker to the microphone based on the feedback signal and the first signal, obtain at least one preset feedback path transfer function, and compare the feedback path transfer function and the at least one preset feedback path transfer function. The signal processing module is configured to determine the state of the bone conduction hearing device based on a comparison result.

One of the embodiments of the present disclosure provides a computer-readable storage medium, wherein the storage medium stores computer instructions, when a computer reads the computer instructions in the storage medium, the computer is directed to: generate a third sound based on a first signal, wherein the first signal is a test signal generated by the computer; receive the third sound and generate a feedback signal; determine a feedback path transfer function from a speaker to a microphone of a bone conduction hearing device based on the feedback signal and the first signal; obtain at least one preset feedback path transfer function; compare the feedback path transfer function and the at least one preset feedback path transfer function; and determine the state of the bone conduction hearing device based on a comparison result.

BRIEF DESCRIPTION OF THE DRAWINGS

The present application will be further described in the form of exemplary embodiments, which will be described in detail by the accompanying drawings. These embodiments are not restrictive. In these embodiments, the same number represents the same structure, where.

DETAILED DESCRIPTION

Figure 1:
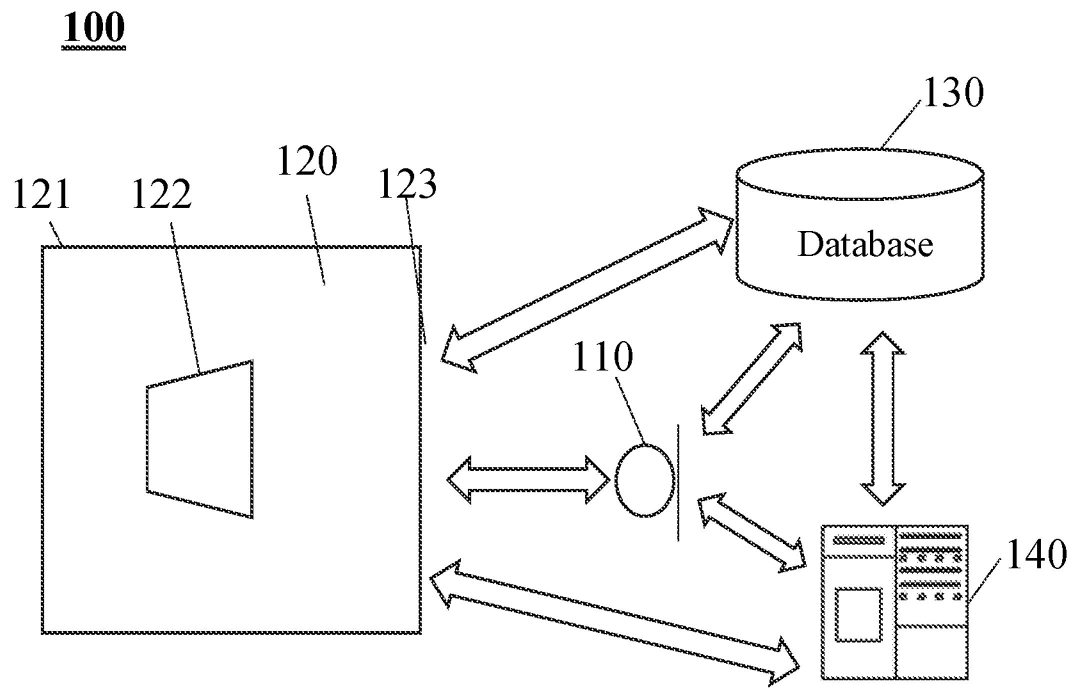
FIG. 1 is a schematic diagram of an application scenario of a transfer function detection system according to some embodiments of the present disclosure.

In order to more clearly explain the technical scheme of the embodiments of the present disclosure, the following will briefly introduce the drawings that need to be used in the description of the embodiments. Obviously, the drawings in the following description are only some examples or embodiments of the present disclosure. For those skilled in the art, the present disclosure can also be applied to other similar scenarios according to these drawings without creative work. Unless it is obvious from the language environment or otherwise stated, the same label in the figure represents the same structure or operation.

It should be understood that the "system," "device," "unit" and/or "module" used herein is a method for distinguishing different components, elements, components, parts or assemblies at different levels. However, if other words serve the same purpose, they may be replaced by other expressions.

As shown in the description and claims, the words "one" and/or "this" do not specifically refer to the singular, but may also include the plural, unless the context clearly indicates exceptions. Generally speaking, the terms "include" and "comprise" only indicate that steps and elements that have been clearly identified are included, and these steps and elements do not constitute an exclusive list. Methods or equipment may also contain other steps or elements.

Flowcharts are used in the present disclosure to explain the operation performed by the system according to the embodiment of the present disclosure. It should be understood that the preceding or subsequent operations are not necessarily performed accurately in sequence. Instead, you can process steps in reverse order or simultaneously. At the same time, you can add other operations to these procedures, or remove one or more operations from these procedures.

For the convenience of explanation, the following describes the use and application process of a sound generation unit by taking a bone conduction speaker or a speaker as examples. It should be noted that the above description is provided for illustrative purposes only and is not intended to limit the scope of the present disclosure.

Below, without losing generality, descriptions of "bone conduction hearing device," "bone conduction hearing device," "bone conduction speaker," "speaker device" or "bone conduction earphone" will be adopted when describing the bone conduction related technology in the present disclosure. The descriptions are only exemplary applications of bone conduction techniques. For ordinary technicians in the field, "speaker" or "earphone" may also be replaced by other similar words, such as "player," "hearing aid," etc. In fact, various implementation methods in the present disclosure can be easily applied to other non-speaker hearing devices. For example, for those skilled in the art, after understanding basic principle of the bone conduction speaker, it may be possible to make various modifications and changes in forms and details of specific ways and steps of implementing the bone conduction speaker without departing from the principle. In particular, a function of environmental sound pickup and processing may be added into the bone conduction speaker to make the speaker realize a function of hearing aid. For example, mikes, such as microphones can pick up the sound of the environment around a user/wearer, process the sound using certain algorithm(s), and transmit the processed sound (or generated electrical signal) to a bone conduction speaker. That is, the bone conduction speaker may be modified to add a function of picking up environmental sound, and after certain signal processing, the sound can be transmitted to the user/wearer through the bone conduction speaker, so as to realize the function of bone conduction hearing aid. For example, the algorithm(s) mentioned here may include one or more combinations of noise cancellation, automatic gain control, acoustic feedback suppression, wide dynamic range compression, active environment recognition, active anti-noise processing, directional processing, tinnitus processing, multi-channel wide dynamic range compression, active howling suppression, volume control, etc.

In some embodiments, a hearing device (e.g., a hearing aid) may typically have both a microphone and a speaker.

Part of the sound emitted by the speaker may be received by the microphone, resulting in a howlround, or cause a user (e.g., a wearer) to hear an echo during the use of the hearing device. In order to suppress the echo or howlround, it is necessary to minimize the influence of the speaker on the microphone (e.g., to remove the sound emitted by the speaker from the signal received by the microphone). Usually, the influence of the speaker on the microphone can be expressed by a feedback path transfer function between the speaker and the microphone. In some embodiments, in a bone conduction hearing device (e.g., a bone conduction hearing aid), the sound generated by a bone conduction speaker may affect a microphone through vibration conduction and air conduction at the same time. Therefore, feedback paths from the bone conduction speaker to the microphone include both air conduction transfer path and vibration transfer path. These two transfer paths correspond to different transfer functions from the bone conduction speakers to the microphones. In some scenarios, it is necessary to better evaluate the impact of the bone conduction speaker on the microphone through different transfer paths, especially the vibration transfer path. For the measurement of the vibration transfer function, it is usually necessary to use additional devices such as an acceleration sensor, which is more complex.

Therefore, some embodiments of the present disclosure provide a method for obtaining a vibration transfer function from a bone conduction speaker to other positions (e.g., a position where the microphone is located, which is connected to the bone conduction speaker through a housing). One or more detectors receive a first sound at a first position and a second sound at a second position. The first sound may be transmitted through air conduction transfer path and vibration transfer path. The second sound may be transmitted through only air conduction transfer path. Thus, the vibration transfer function is determined, and the test method is more efficient and easier to operate.

FIG. 1 is a schematic diagram of an application scenario of a transfer function detection system according to some embodiments of the present disclosure. For the convenience of description, a transfer function detection system 100 may be referred to as a system 100 for short. The system 100 may include at least one detector 110, a hearing device 120, a database 130, and a processor 140. Various components in the system 100 may be connected by any communication and/or connection means including wireless connections, wired connections, or any combination of these connections that enables data transmission and/or reception. In some embodiments, the system 100 may be used to obtain a vibration transfer function of a bone conduction hearing device and detect a state of the bone conduction hearing device.

In some embodiments, the wired connections may be achieved using, for example, a metal cable, an optical cable, or a mixed metal and optical cable, such as a coaxial cable, a communication cable, a flexible cable, a spiral cable, a non-metallic sheathed cable, a metal sheathed cable, a multi-core cable, a twisted pair cable, a ribbon cable, a shielded cable, a telecommunications cable, a twisted pair cable, a parallel twisted pair conductor, and a twisted pair.

The examples described above are only for the convenience of explanation. The wired connections may be achieved using any other type of transmission media, such as a transmission carrier for transmitting electrical signals or optical signals. The wireless connections may include but be not limited to radio communication, free space optical communication, acoustic communication, electromagnetic induction, etc. The radio communication may include but not be limited to IEEE302.11 series standards, IEEE 302.15 series standards (e.g., Bluetooth technology and purple bee technology), first generation mobile communication technology, second generation mobile communication technology (e.g., FDMA, TDMA, SDMA, CDMA, and SSMA), general packet radio service technology, third generation mobile communication technology (e.g., CDMA2000, WCDMA, TD-SCDMA, and WiMAX), fourth generation mobile communication technology (e.g., TD-LTE and FDD-LTE), satellite communication (e.g., GPS technology), near field communication (NFC) and other technologies operating in ISM frequency band (e.g., 2.4 GHz). The free space optical communication may include but be not limited to visible light, infrared signals, etc. The acoustic communication may include but be not limited to sound waves, ultrasonic signals, etc. The electromagnetic induction may include but be not limited to near-field communication technology. The examples described above are for convenience only. The media of the wireless connections may also be other types, such as a Z-wave technology, other charged civil radio bands and military radio bands.

Figure 4:
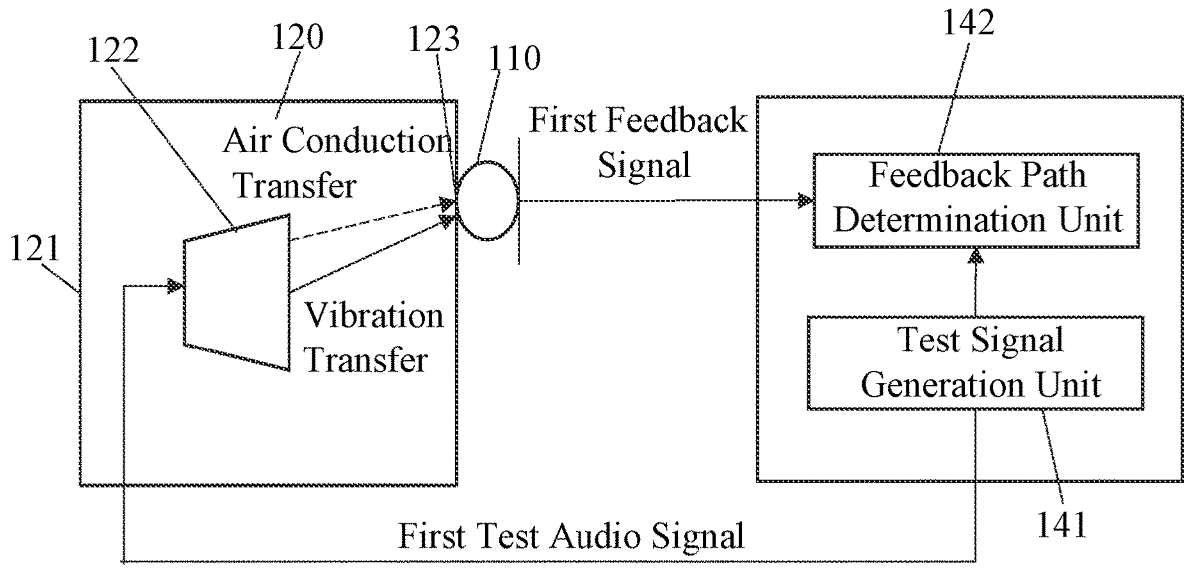
FIG. 4 is a schematic diagram of a transfer function detection system when at least one detector is at a first position according to some embodiments of the present disclosure.
Figure 5:
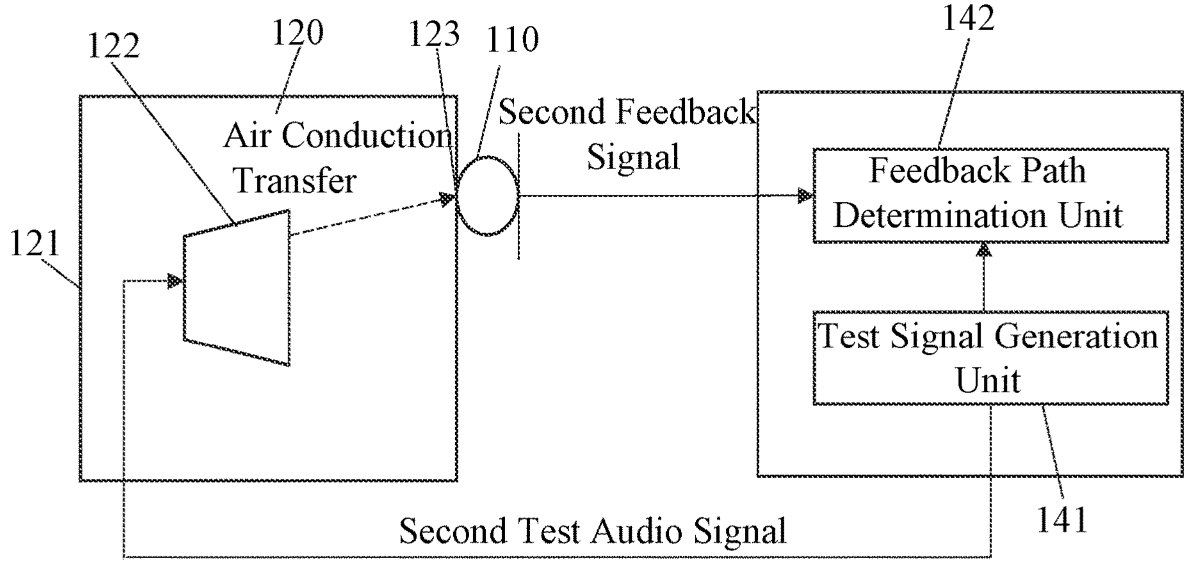
FIG. 5 is a schematic diagram of a transfer function detection system when at least one detector is at a second position according to some embodiments of the present disclosure.

In some embodiments, the hearing device 120 may generally include an air conduction speaker and a bone conduction speaker. In some embodiments, the hearing device 120 may include a bone conduction speaker (e.g., a bone conduction speaker 122 as shown in FIG. 4 and FIG. 5) and a housing 121. The bone conduction speaker 122 and other components (e.g., a microphone) may be accommodated in the housing 121. In order to suppress the influence of the bone conduction speaker 122 on a microphone, it may be necessary to determine a vibration transfer function from the bone conduction speaker 122 to a certain position of interest of the hearing device 120 (e.g., a position 123 as shown in FIG. 1 and FIG. 4). It should be known that the certain position of interest may be a placement position of the microphone (e.g., a microphone actually installed on the hearing device 120), or any position inside or outside the hearing device 120 (e.g., any part of the hearing device 120 that is rigidly or elastically connected with the bone conduction microphone 122).

In some embodiments, the at least one detector 110 may receive sound emitted by the bone conduction speaker 122, and then may generate a feedback signal based on the sound. The feedback signal may reflect an influence of the bone conduction speaker 122 on the at least one detector 110 (or the location of the at least one detector 110). For example, the feedback signal may be sent to the processor 140, and then the processor 140 may determine a feedback path transfer function from the bone conduction speaker 122 to the at least one detector 110 based on the feedback signal. In some embodiments, the at least one detector 110 may also receive a sound in the environment and generate a sound signal based on the sound. The sound in the environment may include, for example, human voice, car sounds, noise of the surrounding environment, etc. In some embodiments, the at least one detector 110 may send the sound signal to the bone conduction speaker 122 and the processor 140, and the bone conduction speaker 122 may generate sound based on the sound signal. In some embodiments, the at least one detector 110 may send the sound signal to the processor 140, then the processor 140 may send the sound signal to the bone conduction speaker 122, and the bone conduction speaker 122 may generate sound based on the sound signal. In some embodiments, the at least one detector 110 may include an acoustoelectric converter, such as a microphone. For example, the microphone may include a ribbon microphone, a micro electro mechanical system (MEMS) microphone, a dynamic microphone, a piezoelectric microphone, a capacitive microphone, a carbon microphone, an analog microphone, a digital microphone, etc., or any combination thereof. As another example, the microphone may include an omnidirectional microphone, a unidirectional microphone, a bidirectional microphone, a cardioid microphone, etc., or any combination thereof. In some embodiments, the at least one detector 110 may include an air conduction microphone and a bone conduction microphone. For the convenience of description, the present disclosure describes a microphone as a detector 110.

The processor 140 may process data and/or information obtained from the at least one detector 110, the bone conduction speaker 122, the database 130, or other components of the system 100. For example, the processor 140 may process an electrical signal generated after the microphone picks up the sound emitted by the bone conduction speaker 122, and thus determine a feedback path transfer function from the bone conduction speaker 122 to the microphone. In some embodiments, the processor 140 may be a single server or server groups. The server groups may be centralized or distributed. In some embodiments, the processor 140 may be local or remote. For example, the processor 140 may obtain information and/or data from the detector 110, the bone conduction speaker 122, and/or the database 130. As another example, processor 140 may be directly connected to the at least one detector 110, the bone conduction speaker 122, and/or the database 130 to access information and/or data.

In some embodiments, the processor 140 may include a test signal generation unit 141 and a feedback path determination unit 142 (as shown in FIG. 4 and FIG. 5). The test signal generation unit 141 may transmit a test audio signal (e.g., a first test audio signal) to the bone conduction speaker 122 and the feedback path determination unit 142. The bone conduction speaker 122 may generate sound (e.g., a first sound) based on the test audio signal. After receiving the sound emitted by the bone conduction speaker 122, the at least one detector 110 may generate a feedback signal (e.g., a first feedback signal) based on the sound and send the feedback signal to the feedback path determination unit 142, and the feedback path determination unit 142 may determine the feedback path transfer function based on the test audio signal and the feedback signal output by the at least one detector 110. In some embodiments, based on a feedback signal transmitted through both air conduction transfer path and vibration transfer path and test audio signal corresponding to the feedback signal, the feedback path determination unit 142 may determine a corresponding feedback path transfer function (i.e., a first feedback path transfer function). Based on the feedback signal transmitted through only air conduction transfer path and the test audio signal corresponding to the feedback signal, the feedback path determination unit 142 may determine a corresponding feedback path transfer function (i.e., a second feedback path transfer function). In some embodiments, the feedback path determination unit 142 may determine the vibration transfer function based on two previously determined feedback path transfer functions.

In some embodiments, the processor 140 may also include a feedback analysis unit and a signal processing unit. In some embodiments, the processor 140 may determine the feedback path transfer function from the bone conduction speaker 122 of the bone conduction hearing device to the at least one detector 110 in real time based on the feedback signal of the at least one detector 110. The processor 140 may also compare the feedback path transfer function determined in real time with other preset feedback path transfer functions to determine a real-time state of the bone conduction hearing device.

The database 130 may store data, instructions, and/or any other information, for example, the first feedback path transfer function described above. In some embodiments, the database 130 may store data obtained from the at least one detector 110, the bone conduction speaker 122, and/or the processor 140. In some embodiments, the database 130 may store data and/or instructions used by the processor 140 to execute or use to implement the exemplary methods described in the present disclosure. In some embodiments, the database 130 may include mass memory, removable memory, volatile read-write memory, read-only memory (ROM), etc., or any combination thereof. In some embodiments, the database 130 may be implemented on a cloud platform.

In some embodiments, the database 130 may communicate with at least one other component (e.g., the processor 140) in the system 100. At least one component in the system 100 may access data stored in the database 130 (e.g., the first feedback path transfer function). In some embodiments, the database 130 may be part of the processor 140.

Figure 2:
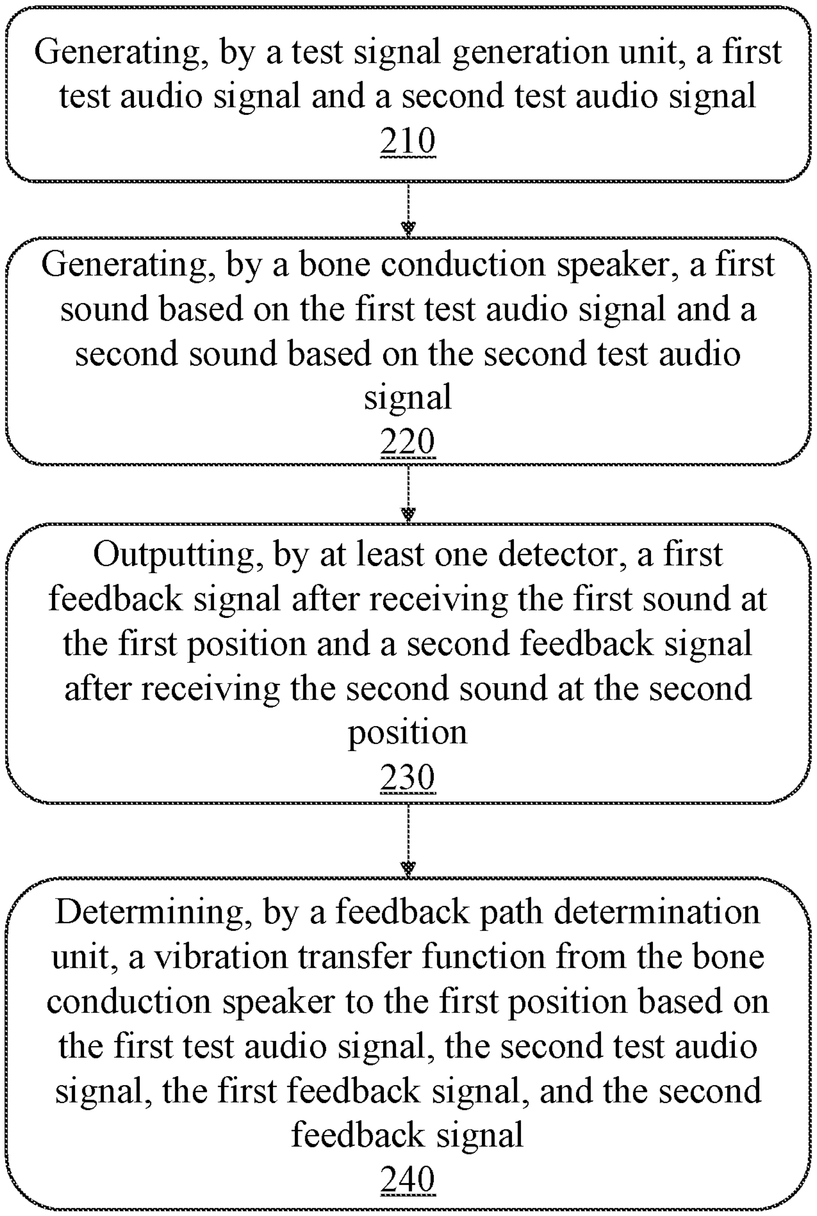
FIG. 2 is an exemplary flowchart of a process for obtaining a vibration transfer function according to some embodiments of the present disclosure.

FIG. 2 is an exemplary flowchart of a process for obtaining a vibration transfer function according to some embodiments of the present disclosure. Specifically, a process 200 may be performed by the system 100 (e.g., the processor 140). For example, the process 200 may be stored in a storage device (e.g., the database 130) in a form of a program or an instruction, and the process 200 may be implemented when the system 100 (e.g., the processor 140) executes the program or instruction.

In step 210, a first test audio signal and a second test audio signal may be generated by the test signal generation unit 141. In some embodiments, step 210 may be performed by a test audio generation module 310.

In some embodiments, the test signal generation unit 141 may be a signal source capable of generating and outputting electrical signals with certain characteristics. For example, the first test audio signal or the second test audio signal may include a white noise signal, a pure audio signal, a pulse signal, a narrow-band noise, a narrow-band chirp, a modulated audio signal, and/or a sweep frequency audio signal. When a sound generating device (e.g., the bone conduction speaker 122) receives a white noise signal, the sound generating device may generate noise with a same energy density at all frequencies, that is, white noise. When the generating device receives a pure audio signal, the sound generating device may produce a single audio sound, that is, a pure sound. When the generating device receives a sweep frequency audio signal, the sound generating device may produce sound with continuously changing frequency from high to low (or from low to high) in a frequency band, that is, a sweep frequency sound.

In some embodiments, the first test audio signal and the second test audio signal may be signals successively generated by the test signal generation unit 141 at different time points and used for testing an equipment to be tested, respectively. In some embodiments, in order to maintain a consistency of two test conditions, the first test audio signal and the second test audio signal may be exactly the same, that is, a type and a frequency of the first test audio signal and the second test audio signal may be the same. For example, the first test audio signal and the second test audio signal may be identical sweep frequency signals. In some embodiments, the type of the first test audio signal and the second test audio signal may be different. For example, the first test audio signal may be the white noise signal, and the second test audio signal may be the pure audio signal.

In some alternative embodiments, the test of the equipment using the first test audio signal and the test of the equipment using the second test audio signal may be performed at a same time at one time. At this time, the test signal generation unit 141 may generate only one test audio signal, for example, only the first test audio signal or the second test audio signal, which can achieve a purpose of testing. More descriptions can be found in relevant descriptions of step 230.

In step 220, the bone conduction speaker 122 may generate the first sound based on the first test audio signal, and generate the second sound based on the second test audio signal.

The first test audio signal and the second test audio signal may be transmitted to the bone conduction speaker 122 in a form of electrical signals, and the bone conduction speaker 122 may convert the above electrical signals into the first sound and the second sound, respectively. In some embodiments, the bone conduction speaker 122 may include a vibrating plate and a transducer. The transducer may be configured to generate vibration, for example, by converting the electrical signals corresponding to the first test audio signal and the second test audio signal into mechanical vibration. The transducer can drive the vibrating plate to vibrate. For example, the vibrating plate may be mechanically connected to and vibrated with the transducer. In practical application (e.g., the user wears the hearing device 120), the vibrating plate may contact the user's skin and transmit the vibration to auditory nerve through human tissues and bones, so that the user can hear the sound.

In some embodiments, the bone conduction speaker 122 may sequentially generate the first sound and the second sound based on the first test audio signal and the second test audio signal. For example, the first sound may be generated first, and the second sound may be generated after the microphone receives the first sound and outputs the first feedback signal. Alternatively, the second sound may be generated first, and the first sound may be generated after the microphone receives the second sound and outputs the second feedback signal.

In some embodiments, the first sound and the second sound may be sequentially generated by a same bone conduction speaker 122 at a same position of a same hearing device 120. In such cases, by changing a position of the microphone, the influence of the sound emitted by the bone conduction speaker 122 on different positions can be obtained, so as to obtain the transfer function corresponding to different acoustic paths. In other embodiments, the bone conduction speaker 122 may include two bone conduction speakers 122 with a same structure and material, and the two bone conduction speakers 122 may generate the first sound and the second sound based on the first test audio signal and the second test audio signal, respectively.

In step 230, at least one detector may output a first feedback signal after receiving the first sound at the first position, and output a second feedback signal after receiving the second sound at the second position.

The at least one detector may receive the first sound and generate the first feedback signal based on the first sound, receive the second sound and generate the second feedback sign, and send the first feedback signal and the second feedback signal to a feedback path test device (e.g., the feedback path determination unit 142).

For the convenience of description, the following description takes the at least one detector including an air conduction microphone (e.g., a microphone in FIG. 4 and FIG. 5) as an example. The microphone may receive the first sound at the first position transmitted by the bone conduction speaker 122 through a first method. For example, the bone conduction speaker 122 may be fixed on the hearing device 120 (that is, the bone conduction speaker 122 may be rigidly or elastically connected with the hearing device 120), and the first position may be another position close to the hearing device 120 (such as the housing 121 in FIG. 1 or FIG. 4). When the microphone is at the first position, the microphone may be rigidly or elastically connected with the hearing device 120. According to a sound producing principle of the bone conduction speaker 122, when the bone conduction speaker 122 generates the first sound, the bone conduction speaker 122 may drive the hearing device 120 (the housing) to vibrate, and the vibration of the hearing device 120 may be transmitted to the microphone close to the hearing device 120. For example, as shown in FIG. 4, the first position may be a position adjacent to the housing 121 of the hearing device 120. Assuming that a vibration direction of the housing 121 is parallel to a vibration direction of a diaphragm of the microphone, a vibration of the housing 121 may also cause a vibration of the diaphragm of the microphone. At the same time, the bone conduction speaker 122 may also drive a vibration of surrounding air when producing the first sound, and the vibration of the air may be transmitted to the microphone in a form of air conduction. Therefore, the first sound may be transmitted to the microphone through vibration conduction and air conduction at the same time. In other words, the first method above may include vibration conduction and air conduction.

In some embodiments, the microphone may generate the first feedback signal based on the first sound transmitted through the above two transfer paths, and the microphone may send the first feedback signal to the feedback path determination unit 142 and/or store it in a storage device (e.g., the database 130).

Similarly, the microphone may receive the second sound at the second position transmitted by the bone conduction speaker 122 through a second method. For example, the second position may not be in contact with the hearing device 120 (the housing 121) but close to the first position. When the microphone is at the second position, the microphone may be deemed as being suspended relative to the hearing device 120. Alternatively, the second position may be located inside or outside the (housing) of the hearing device 120, as long as the microphone is not rigidly or elastically connected with the hearing device 120 at its position. For example, in FIG. 5, since the microphone is not contacted with the housing 121 when at the second position, the diaphragm of the microphone may only receive sound transmitted by air and not be affected by the vibration of the housing 121. Therefore, the second sound may only be transmitted to the microphone through air conduction. In other words, the second method mentioned above may only include air conduction. In some embodiments, the microphone may generate the second feedback signal based on the second sound transmitted through air conduction transfer path, and the microphone may send the second feedback signal to the feedback path determination unit 142 and/or store it in a storage device (e.g., the database 130). It should be understood that when a distance between the second position and the first position is very small (e.g., less than 1 mm, 5 mm, 1 cm, 5 cm), it may be approximately considered that air conduction transfer path from the bone conduction speaker 122 to the first position is the same as air conduction transfer path from the bone conduction speaker 122 to the second position.

In some alternative embodiments, when the microphone is at the first position and the vibration direction of the housing 121 is vertical to the vibration direction of the diaphragm of the microphone, the vibration of the housing 121 may not cause vibration of vibrating parts (e.g., the diaphragm) of the microphone. In such cases, it can be considered that the microphone may only receive the sound transmitted by air at the first position. Therefore, a process of placing the microphone at the second position away from the housing 121 to receive the second sound may be replaced by adjusting an orientation of the microphone so that when the microphone is at the first position, the vibration direction of the diaphragm may be vertical to the vibration direction of the housing 121. Since the diaphragm is not affected by the vibration of the housing 121, even if the microphone is close to the housing 121, the second sound the microphone receives may only be transmitted through air conduction. Therefore, when the vibration direction of the diaphragm of the microphone is vertical to the vibration direction of the housing 121, only air conduction feedback path transfer function may need to be considered when determining the feedback path transfer function. It can be understood that when the bone conduction speaker 122 respectively generates the first sound and the second sound, it may be only necessary to set the vibration direction of the diaphragm of the microphone at the first position to be parallel or vertical to the vibration direction of the housing 121. Then, the microphone may output the first feedback signal and the second feedback signal, respectively, according to the received first sound and the second sound.

In some embodiments, the at least one detector (e.g., the air conduction microphone or the microphone) may include a first detector (e.g., a first air conduction microphone) and a second detector (e.g., a second air conduction microphone) with same structures and materials. In some embodiments, the at least one detector (e.g., the air conduction microphone or the microphone) may include the first detector (e.g., a silicon microphone) and the second detector (e.g., an electret microphone) with different structures and materials. In some embodiments, the microphone may be an air conduction microphone or a bone conduction microphone. For convenience of understanding, an air conduction microphone is described in the present disclosure. The first detector may be located at the first position for receiving the first sound, and the second detector may be located at the second position for receiving the second sound. Similar to the above embodiments, the first detector may output the first feedback signal after receiving the first sound, and the second detector may output the second feedback signal after receiving the second sound.

In other embodiments, the first detector and the second detector may be placed at the first position and the second position, respectively, at the same time, and the first detector and the second detector may receive a same sound at the same time. For example, the bone conduction speaker 122 may generate the first sound based on only one test audio signal (e.g., the first test audio signal), and the first detector and the second detector may be respectively located at the first position and the second position to receive the first sound at the same time. In these embodiments, although the first detector and the second detector receive the same sound, a first sound transfer path received by the first detector may include air conduction transfer path and vibration transfer path, while the first sound received by the second detector may only include air conduction transfer path, so feedback signals output by the first detector and the second detector may be different. For convenience of descriptions, the feedback signal output by the first detector may also be referred to as the first feedback signal, and the feedback signal output by the second detector may also be referred to as the second feedback signal. The first feedback signal and the second feedback signal output by a same detector located at the first position and the second position respectively may have a small difference, and the first and second feedback signals can be considered to be approximately the same.

In step 240, the feedback path determination unit 142 may determine a vibration transfer function from the bone conduction speaker 122 to the first position based on the first test audio signal, the second test audio signal, the first feedback signal, and the second feedback signal. In some embodiments, step 240 may be performed by a processing module 320.

In some embodiments, after receiving the first feedback signal and the second feedback signal output from the microphone, the feedback path determination unit 142 may determine the feedback path transfer function based on the first test audio signal, the second test audio signal, the first feedback signal, and the second feedback signal according to a feedback path transfer function measurement principle. In some embodiments, the feedback path determination unit 142 may obtain the first test audio signal from the test signal generation unit 141. In some embodiments, after receiving the first test audio signal and the first feedback signal, the feedback path determination unit 142 may determine the first feedback path transfer function of the first sound transmitted from the bone conduction speaker 122 to the first position based on the first test audio signal and the first feedback signal. For example, the feedback path determination unit 142 may transform the first test audio signal to obtain a first transformed test audio signal, and transform the first feedback signal to generate a first transformed feedback signal. In some embodiments, the feedback path determination unit 142 may transform the first test audio signal and the first feedback signal using Z-transformation. For example, the first test audio signal input by the bone conduction speaker 122 may be transformed into the first transformed test audio signal by Z-transformation, and the first feedback signal output by the air conduction microphone may be transformed into the first transformed feedback signal by Z-transformation. In some embodiments, the transformation may be performed using a Fourier transformation method, a Laplace transformation method, a linear prediction encoder or other also speech model solving method, etc.

In some embodiments, a transfer function measurement method may include, but may be not limited to, a cross-correlation method, an adaptive estimation method, and the like. In some embodiments, the transfer function measurement method may include obtaining a transformed signal by transforming a sound signal and an electrical signal, and then determining a transfer function according to the transformed signal. Related descriptions may be found in descriptions of formulas (1)-(5).

For purpose of illustration, the feedback path determination unit 142 may obtain the first feedback path transfer function through a formula (1) below based on the first transformed test audio signal and the first transformed feedback signal:

$$F_1(z) = \frac{Y_1(z)}{X_1(z)}, \quad (1)$$

wherein, $Y_1(z)$ is the first transformed test audio signal, $X_1(z)$ is the first transformed feedback signal, $F_1(z)$ is the first feedback path transfer function. As mentioned above, the first feedback path transfer function $F_1(z)$ may indicate an influence of the air conduction transmission path and the vibration transmission path from the bone conduction speaker 122 to the first position.

In some embodiments, the feedback path determination unit 142 may obtain a second test audio signal from the test signal generation unit 141. In some embodiments, after receiving the second test audio signal and the second feedback signal, the feedback path determination unit 142 may determine the second feedback path transmission function of the second sound transmitted from the bone conduction speaker 122 to the second position based on the second test audio signal and the second feedback signal. For example, the feedback path determination unit 142 may transform the second test audio signal and the second feedback signal respectively to obtain the second transformed test audio signal and the second transformed feedback signal. In some embodiments, the feedback path determination unit 142 may transform the second test audio signal and the second feedback signal using Z-transformation. For example, the second test audio signal input by the bone conduction speaker 122 may be transformed into the second transformed test audio signal by Z-transformation, and the second feedback signal output by the microphone may be transformed into the second transformed feedback signal by Z-transformation.

Similarly, for illustration purposes, the feedback path determination unit 142 may obtain the second feedback path transfer function through a formula (2) based on the second transformed test audio signal and the second transformed feedback signal:

$$F_2(z) = \frac{Y_2(z)}{X_2(z)}, \quad (2)$$

wherein, $Y_2(z)$ is the second transformed test audio signal, $X_2(z)$ is the second transformed feedback signal, $F_2(z)$ is the second feedback path transfer function. As mentioned above, the second feedback path transfer function $F_2(z)$ may only include an influence of air conduction transmission path between the bone conduction speaker 122 and the second position (or the first position).

By solving formula (1) and formula (2) provided above, the feedback path determination unit 142 may determine the first feedback path transfer function corresponding to the first sound transmitted through air conduction transfer path and vibration transfer path, and determine the second feedback path transfer function corresponding to the second sound transmitted through air conduction transfer path, then, a vibration transfer function from the bone conduction speaker 122 to the first position may be determined through subsequent analysis.

In some embodiments, the feedback path determination unit 142 may determine the vibration transfer function from the bone conduction speaker 122 to the first position based on the first feedback path transfer function $F_1(z)$ and the second feedback path transfer function $F_2(z)$.

Specifically, since the first transfer path of the first sound received by the microphone at the first position may include air conduction transfer path and vibration transfer path, and the second transfer path of the second sound received by the microphone at the second position may only include air conduction transfer path, output signals of the air microphone (that is, the first feedback signal and the second feedback signal) may be different.

For illustration purposes, a first feedback path transfer function including air conduction transfer path and vibration transfer path can be expressed as:

$$F_1(z)=A_1(z)+B_1(z), \quad (3)$$

wherein, $A_1(z)$ is the air conduction feedback path transfer function from the bone conduction speaker 122 to the first position, $B_1(z)$ is the vibration transfer function from the bone conduction speaker 122 to the first position.

Figure 6:
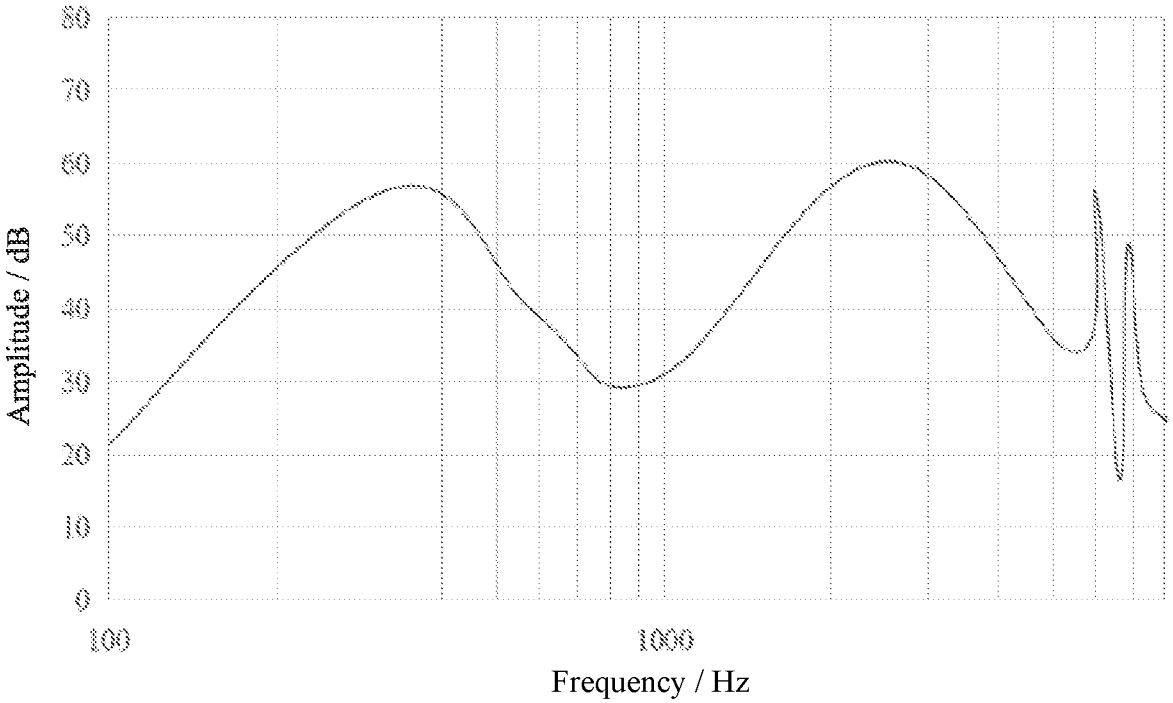
FIG. 6 is a graph of a first feedback path transfer function according to some embodiments of the present disclosure.

FIG. 6 shows a graph of the first feedback path transfer function $F_1(z)$ determined by the formula (3).

Figure 7:
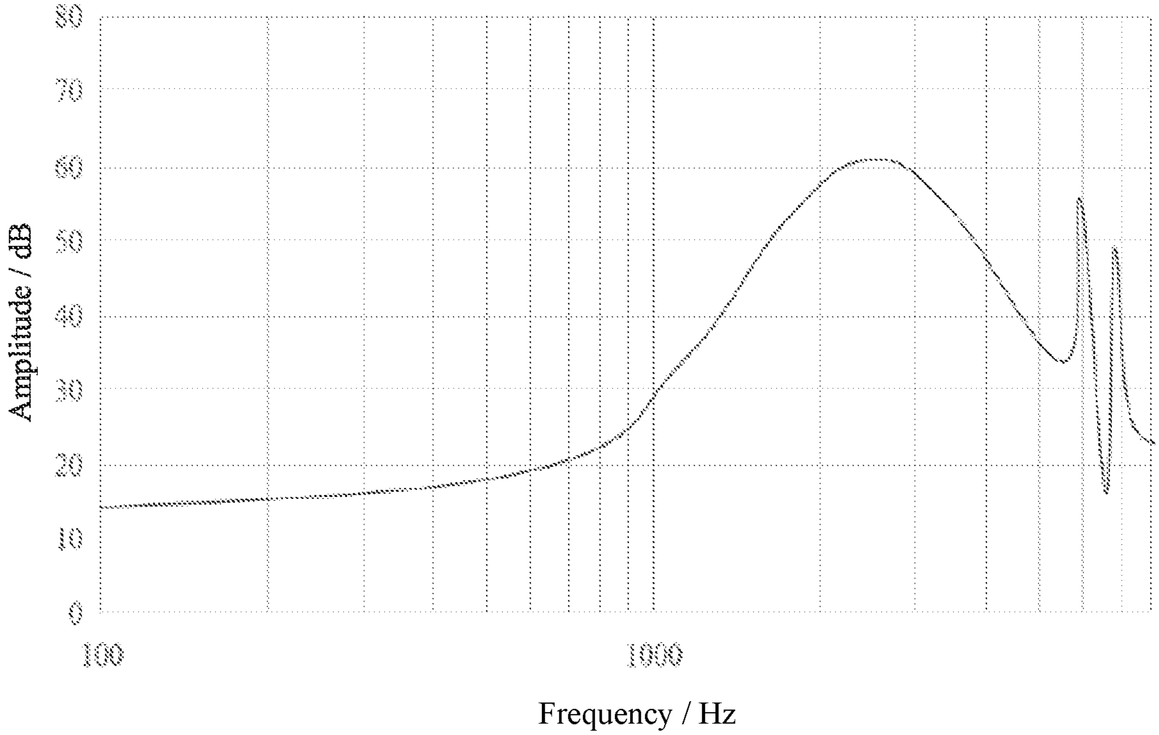
FIG. 7 is a graph of a second feedback path transfer function according to some embodiments of the present disclosure.

In some embodiments, considering a small distance between the second position and the first position, air conduction transfer path from the bone conduction speaker 122 to the second position may be approximately equivalent to air conduction transfer path from the bone conduction speaker 122 to the first position. Therefore, a transfer function of the second feedback path including only air conduction transfer path may be expressed as:

$$F_2(z)=A_2(z), \quad (4)$$

wherein, $A_2(z)$ is an air conduction feedback path transfer function from the bone conduction speaker 122 to the second position, $A_2(z)$ may be same or approximately the same as the air conduction feedback path transfer function $A_1(z)$ from the bone conduction speaker 122 to the first position. FIG. 7 shows a graph of the second feedback path transfer function $F_2(z)$ determined by the formula (2). As mentioned above, the second feedback path transfer function $F_2(z)$ may only indicate the influence of the air conduction transmission path between the bone conduction speaker 122 and the second position (or the first position).

In some embodiments, the feedback path determination unit 142 may determine the vibration transfer function from the bone conduction speaker 122 to the first position based on the first feedback path transfer function $F_1(z)$ and the second feedback path transfer function $F_2(z)$. Specifically, because the second feedback path transfer function $F_2(z)$ only includes the air conduction feedback path transfer function $A_1(z)$, and the first feedback path transfer function $F_1(z)$ includes the air conduction feedback path transfer function $A_1(z)$ and the vibration transfer function $B_1(z)$, so the feedback path determination unit 142 may subtract the formula (4) from the formula (3) to determine the vibration transfer function $B_1(z)$:

$$B_1(z)=F_1(z)-F_2(z). \quad (5)$$

FIG. 6 is a graph of the first feedback path transfer function including air conduction transfer path and vibration transfer path. A curve in FIG. 6 shows a situation when the first sound received at the first position is transmitted through both the air conduction path and vibration transfer path at different frequencies. It can be seen that in a range around 1000 Hz (e.g., 600 Hz-1000 Hz), an influence of the bone conduction speaker on the first position through both air conduction path and vibration transfer path has a trough (i.e., the influence is small) relative to other frequency ranges; in a range of 300 Hz-400 Hz and 2000 Hz-3000 Hz, the influence of the bone conduction speaker on the first position through the air conduction path and vibration transfer path at the same time has a peak (i.e., the influence is large) relative to other frequency ranges.

Figure 8:
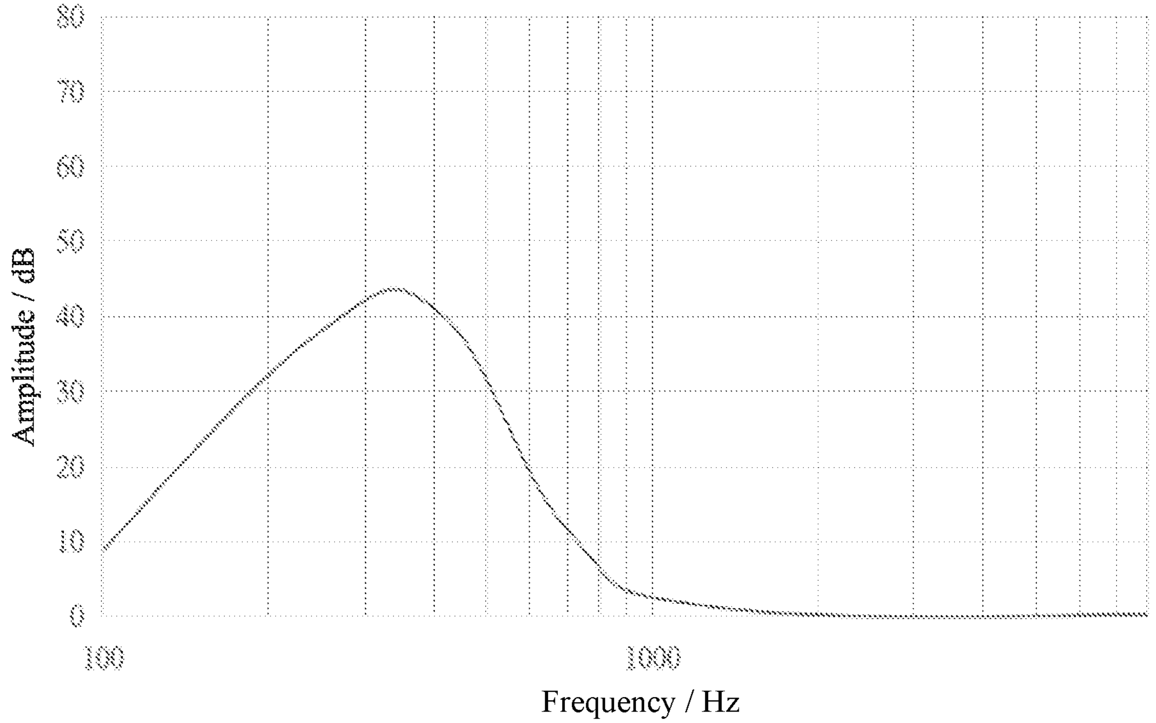
FIG. 8 is a graph of a vibration transfer function according to some embodiments of the present disclosure.

FIG. 7 is a graph of the second feedback path transfer function including only air conduction transfer path. A curve in FIG. 7 shows a situation when the second sound received at the second position is transmitted through only the air conduction path at different frequencies. When the frequency is in a range of 0 Hz-1000 Hz, the bone conduction speaker may have little influence on the second position through the air conduction path. When the frequency is in a range of 1000 Hz-3000 Hz, the bone conduction speaker may have a greater impact on the second position through the air conduction path. In some embodiments, when the second feedback path transfer function in FIG. 7 is subtracted from the first feedback path transfer function in FIG. 6, a curve as shown in FIG. 8 can be obtained. It can be seen from FIG. 8 that the vibration transfer path may have a greater impact on parts with frequencies in a range from 0 Hz to 1000 Hz, and a smaller impact on parts with frequencies above 1000 Hz. Based on FIG. 6, FIG. 7, and FIG. 8, it can be seen that the influence of the bone conduction speaker on the first position through the vibration transfer path may be mainly concentrated in a low frequency range (e.g., less than 1000 Hz), while an influence of the bone conduction speaker on the first position (or the second position) through the air transfer path may be mainly concentrated in a high frequency range (e.g., greater than 1000 Hz).

In some embodiments, the feedback path determination unit 142 may determine a vibration feedback signal of the bone conduction speaker 122 to the first position based on the first feedback signal and the second feedback signal.

For illustration purposes, the feedback path determination unit 142 may obtain the vibration feedback signal based on the first feedback signal and the second feedback signal through a formula (6):

$$X_d=X_1-X_2, \tag{6}$$

wherein, $X_1$ is the first feedback signal, $X_2$ is the second feedback signal, $X_d$ is the vibration feedback signal.

In some embodiments, the feedback path determination unit 142 may determine the vibration transfer function from the bone conduction speaker 122 to the first position based on the first test audio signal, the second test audio signal, and the vibration feedback signal.

In some embodiments, the feedback path determination unit 142 may transform the first test audio signal, the second test audio signal, and the vibration feedback signal respectively to obtain the first transformed test audio signal, the second transformed test audio signal, and the transformed vibration feedback signal. For example, the first test audio signal $Y_1$ may be transformed to obtain the first transformed test audio signal $Y_1(z)$ by Z-transformation, the second test audio signal $Y_2$ may be transformed to obtain the second transformed test audio signal $Y_2(z)$ by Z-transformation, the second test audio signal $X_d$ may be transformed to obtain the second transformed test audio signal $X_d(z)$ by Z-transformation.

In some embodiments, the feedback path determination unit 142 may determine the first feedback path transfer function from the sound generation unit to the first position based on the first transformed test audio signal, the second transformed test audio signal, and the transformed vibration feedback signal. Specifically, the feedback path determination unit 142 may determine a mean value or a weighted average value of the first transformed test audio signal and the second transformed test audio signal to obtain a mean transformed test audio signal.

For the purpose of explanation, the feedback path determination unit 142 may obtain the mean transformed test audio signal based on the first transformed test audio signal and the second transformed test audio signal through a formula (7):

$$Y_d(z)=(Y_1(z)+Y_2(z))/2, \tag{7}$$

wherein, $Y_1(z)$ is the first transformed test audio signal, $Y_2(z)$ is the second transformed test audio signal, $Y_d(z)$ the mean transformed test audio signal.

In some embodiments, the feedback path determination unit 142 may obtain the vibration transfer function from the bone conduction speaker 122 to the first position based on the mean transformed test audio signal and the transformed vibration feedback signal.

For illustration purposes, the feedback path determination unit 142 may obtain the vibration transfer function from the bone conduction speaker 122 to the first position through a formula (8) based on the mean transformed test audio signal and the transformed vibration feedback signal:

$$B_1(z)=\frac{Y_d(z)}{X_d(z)}, \tag{8}$$

wherein, $Y_d(z)$ is the mean transformed test audio signal, $X_d(z)$ is the transformed vibration feedback signal, $B_1(z)$ is the vibration transfer function.

In some embodiments, the feedback path determination unit 142 may also determine an average value and a weighted average of the first test audio signal and the second test audio signal to obtain a mean test audio signal. The mean test audio signal and the vibration feedback signal may be transformed to obtain a mean transformed test audio signal and a transformed vibration feedback signal. Then, based on the mean transformed test audio signal and the transformed vibration feedback signal, the vibration transfer function from the bone conduction speaker 122 to the first position may be obtained.

It should be noted that the above descriptions are provided for illustrative purposes only and are not intended to limit the scope of the present disclosure. For those skilled in the art, many changes and modifications can be made under the guidance of the content of the present disclosure. The features, structures, methods, and other features of the exemplary embodiments described herein may be combined in various ways to obtain additional and/or alternative exemplary embodiments. For example, the feedback path determination unit 142 may include a first determination unit and a second determination unit, the first determination unit may be configured to determine the first feedback path transfer function of the first feedback path, and the second determination unit may be used to determine the second feedback path transfer function. However, these changes and modifications will not deviate from the scope of the present disclosure.

Figure 3:
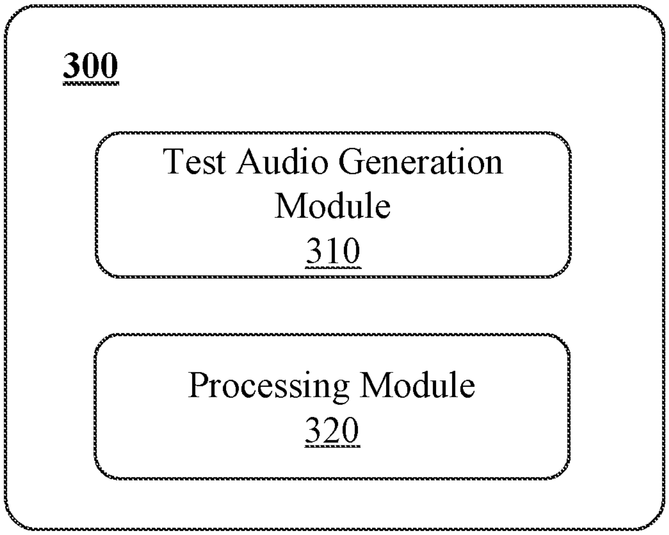
FIG. 3 is an exemplary module diagram of a system for obtaining a vibration transfer function according to some embodiments of the present disclosure.

FIG. 3 is an exemplary module diagram of a system for obtaining a vibration transfer function according to some embodiments of the present disclosure. A system 300 for obtaining the vibration transfer function may be referred to as a system 300 for short. As shown in FIG. 3, the system 300 may include a test audio generation module 310 and a processing module 320. In some embodiments, the system 300 may be implemented by the system 100 (e.g., the processor 140) shown in FIG. 1.

The test audio generation module 310 may be configured to generate a first test audio signal and a second test audio signal. In some embodiments, the first test audio signal or the second test audio signal may include at least one of a white noise signal, a pure audio signal, a pulse signal, a narrow-band noise, a narrow-band chirp, a modulated audio signal, and/or a sweep audio signal. In some embodiments, the types and the frequencies of the first test audio signal and the second test audio signal may be the same, for example, the first test audio signal and the second test audio signal may be pure audio signals of a same frequency. In some embodiments, the type of the first test audio signal and the type of the second test audio signal may be different. For example, the first test audio signal may be the white noise, and the second test audio signal may be the pure audio signal. In some embodiments, the test audio generation module 310 may generate only one test audio signal, such as only the first test audio signal or the second test audio signal, which can also achieve a purpose of obtaining the vibration transfer function. For details, please refer to relevant descriptions of step 230.

The processing module 320 may be used to determine the vibration transfer function from the bone conduction speaker 122 to the first position based on the first test audio signal, the second test audio signal, the first feedback signal, and the second feedback signal. The first feedback signal may reflect a signal transmitted from the bone conduction speaker 122 to the first position through vibration transfer path and air transfer path, the second feedback signal may reflect a signal transmitted from the bone conduction speaker 122 to the second position through air conduction transfer path. The first feedback signal may be output by at least one microphone after receiving the first sound at the first position, and the second feedback signal may be output by the at least one microphone after receiving the second sound at the second position. The first sound and the second sound may be generated by the bone conduction speaker 122 based on the first test audio signal and the second test audio signal, respectively. For more information about generating the first sound and the second sound based on the first test audio signal and the second test audio signal, please refer to detailed descriptions of step 220, which will not be repeated here.

In some embodiments, after receiving the first test audio signal, the processing module 320 may determine the first feedback path transfer function from the first sound transmitted from the bone guide speaker 122 to the first position based on the first test audio signal and the first feedback signal. For more information about determining the first feedback path transfer function, please refer to detailed descriptions of step 240 in FIG. 2, which will not be repeated here.

In some embodiments, the processing module 320 may also determine the second feedback path transfer function of the second sound transmitted from the bone guide speaker 122 to the second position based on the second test audio signal and the second feedback signal. For more information about determining the transfer function of the second feedback path, please refer to detailed descriptions of step 240 in FIG. 2, which will not be repeated here.

In some embodiments, the processing module 320 may determine the vibration transfer function from the bone conduction speaker 122 to the first position based on the first feedback path transfer function and the second feedback path transfer function. For more information about determining the vibration transfer function from the bone conduction speaker 122 to the first position, please refer to detailed descriptions of step 240 in FIG. 2, which will not be repeated here.

In some embodiments, the processing module 320 may determine the vibration feedback signal from the bone conduction speaker 122 to the first position based on the first feedback signal and the second feedback signal. In some embodiments, the processing module 320 may also determine the vibration transfer function from the bone conduction speaker 122 to the first position based on the first test audio signal, the second test audio signal, and the vibration feedback signal. For more information about determining the vibration transfer function from the bone conduction speaker 122 to the first position, please refer to detailed descriptions of step 240 in FIG. 2, which will not be repeated here.

It should be noted that the above descriptions are provided for illustrative purposes only and are not intended to limit the scope of the present disclosure. For those skilled in the art, many changes and modifications can be made under the guidance of the content of the present disclosure. The features, structures, methods, and other features of the exemplary embodiments described herein may be combined in various ways to obtain additional and/or alternative exemplary embodiments. For example, the processing module 320 may include a first processing module and a second processing module, the first processing module may be configured to determine the first feedback path transfer function of the first feedback path, and the second processing module may be configured to determine the second feedback path transfer function. However, these changes and modifications will not deviate from the scope of the present disclosure.

In other embodiments of the present disclosure, a computer-readable storage medium may be provided, including at least one processor 140 and at least one database 130. The at least one database 130 may be configured to store computer instructions, and the at least one processor 140 may be configured to execute at least part of the computer instructions to implement the above process 200.

Figure 9:
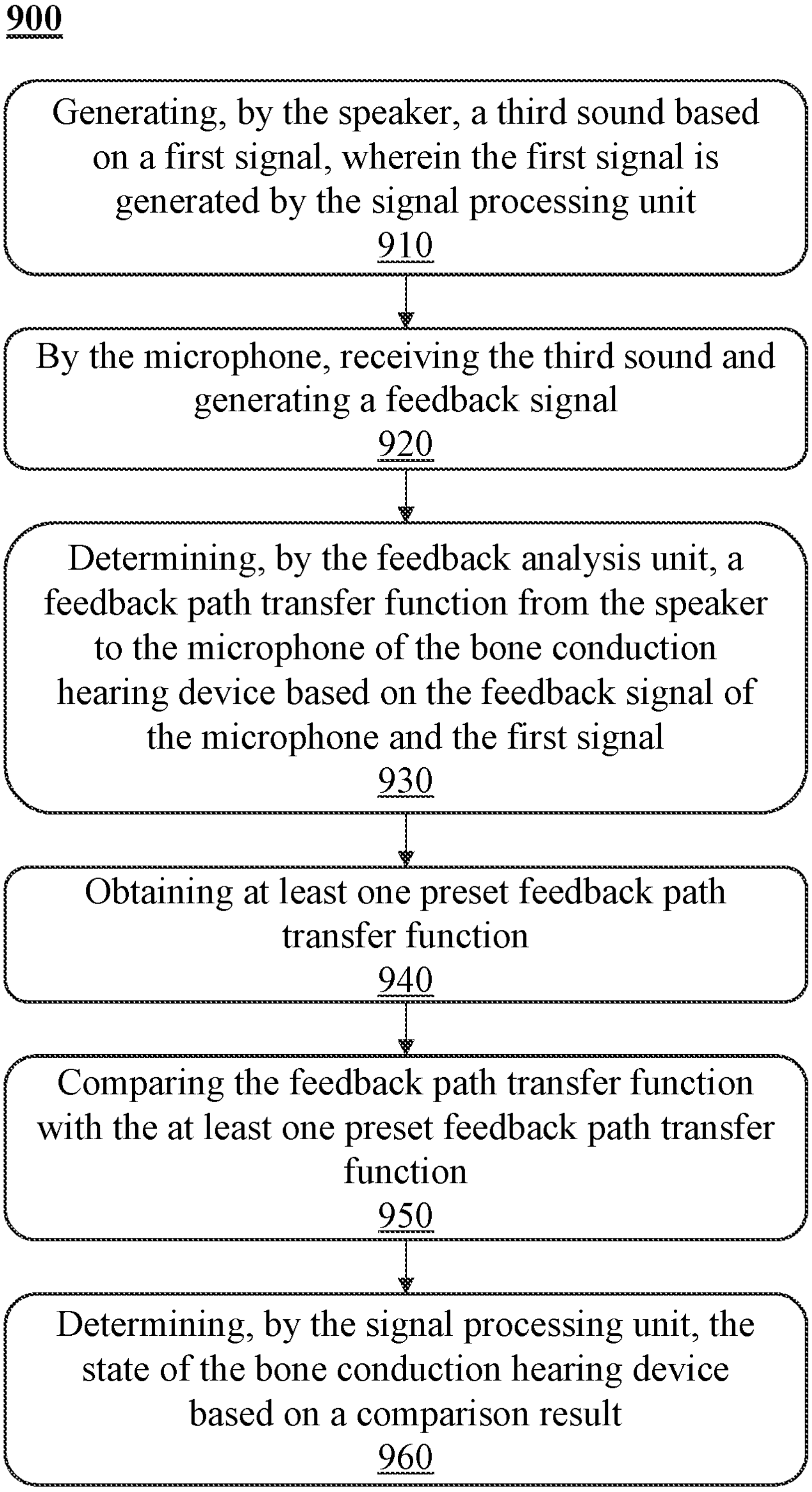
FIG. 9 is an exemplary flowchart of a process for detecting a state of a bone conduction hearing device according to some embodiments of the present disclosure.

In other embodiments of the present disclosure, a method for detecting a state of a bone conduction hearing device is also provided. FIG. 9 is an exemplary flowchart of a process for detecting a state of a bone conduction hearing device according to some embodiments of the present disclosure. The bone conduction hearing device may at least include a microphone, a speaker, a feedback analysis unit, and a signal processing unit. In some embodiments, the microphone may include a bone conduction microphone, an air conduction microphone, etc. The above microphone may be exemplary embodiments of the at least one detector disclosed in the present disclosure, for example, the microphone may be the microphone shown in FIG. 4 and FIG. 5. The speaker may include a bone conduction speaker configured to convert electrical signals into vibration signals, which may be the same as or different from the bone conduction speaker 122. The microphone and the bone conduction speaker may be respectively installed at different positions of the bone conduction hearing device. For example, the microphone and the speaker may be respectively fixed at different positions on the housing of the bone conduction hearing device. In some embodiments, the feedback analysis unit and the signal processing unit may be two separate devices, or they may be components in one device that implement two different functions. For example, the feedback analysis unit and the signal processing unit may be combined into a state detection device. It can be understood that the state detection device may be combined with the microphone and speaker to form an integral device, or it may be a device independent from the microphone and the speaker. In order to distinguish the above two setting methods, the following descriptions provide two application scenarios. For example, when the state detection device is combined with the microphone and the speaker to form an integral device, the bone conduction hearing device may realize a state self-detection before or during use to detect whether the bone conduction hearing device is in a normal state or an abnormal state. The abnormal state may include one or more of an incorrect wearing state, an abnormal structure state, a foreign body intrusion state, and a foreign body blocking state. As another example, when the state detection device is set independently from the microphone and the speaker, the bone conduction hearing device may communicate and/or connect with the state detection device before or during use to detect the state of the bone conduction hearing device, and detect whether the bone conduction hearing device is in a normal state or an abnormal state. The abnormal state may include one or more of an incorrect wearing state, an abnormal structure state, a foreign body intrusion state, and a foreign body blocking state.

The method of detecting the state of the bone conduction hearing device may include the following steps:

In step 910, the speaker may generate a third sound based on a first signal. In some embodiments, the first signal may be similar to the first test audio signal or the second test audio signal, which will not be repeated here. In some embodiments, step 910 may be performed by a sound generation module 1010.

In some embodiments, the first signal (i.e., a sound test signal) may be generated by the signal processing unit, which may be transmitted to the speaker, and the speaker may convert the first signal into the third sound.

In step 920, the microphone may receive the third sound and generates a feedback signal. In some embodiments, step 920 may be performed by the feedback signal generation module 1020.

The sound generated by the speaker may be received by the microphone, and the microphone may generate corresponding feedback information. In some embodiments, after the microphone receives the third sound, it may generate a feedback signal based on the third sound and send the feedback signal to the feedback analysis unit. In some embodiments, the microphone may generate a feedback signal in a similar or the same manner as the first feedback signal as aforementioned.

In step 930, the feedback analysis unit may determine a feedback path transfer function from the speaker of the bone conduction hearing device to the microphone based on the feedback signal and the first signal of the microphone. Step 930 may be performed by a feedback analysis module 1030.

In some embodiments, a method of determining the feedback path transfer function from the speaker of the bone conduction hearing device to the microphone may be the same as a method of determining the first feedback path transfer function $F_1(z)$ and/or the second feedback path transfer function $F_2(z)$ in FIG. 2. For a purpose of explanation, a feedback path transfer function $F_3(z)$ from the speaker of the bone conduction hearing device to the microphone may be determined by a formula (9):

$$F_3(z) = \frac{Y_3(z)}{X_3(z)}, \tag{9}$$

wherein, $Y_3(z)$ represents a first transformed signal obtained by performing the Z-transformation on the first signal input by the bone conduction hearing device, $X_3(z)$ represents the transformed feedback signal obtained by performing the Z-transformation on the feedback signal output by the microphone.

By performing the Z-transformation on the first signal and the feedback signal, the first transformed signal $Y_3(z)$ and the transformed feedback signal $X_3(z)$ may be obtained. Therefore, the feedback path transfer function from the speaker of the bone conduction hearing device to the microphone may be determined by the formula (9).

In step 940, at least one preset feedback path transfer function may be obtained. Step 940 may be performed by the feedback analysis module 1030.

The preset feedback path transfer function(s) may be understood as feedback path transfer function(s) that are previously set or stored in a storage device (e.g., the database 130). In some embodiments, the preset feedback path transfer function(s) may include a feedback path transfer function determined according to the method disclosed in other embodiments of the present disclosure (e.g., step 240), such as the first feedback path transfer function. In some embodiments, the preset feedback path transfer function(s) may also be a feedback path transfer function manually set by an operator according to experience. In some embodiments, the preset feedback path transfer function(s) may include at least one of a standard feedback path transfer function or an abnormal feedback path transfer function. The standard feedback path transfer function may be a feedback path transfer function corresponding to a normal state of the bone conduction hearing device. For example, the standard feedback path transfer function may reflect a feedback path characteristic function of the bone conduction hearing device when it is worn by a wide range of people, or it may be a personalized feedback path characteristic function of a specific user when it is normally worn and used. The abnormal feedback path transfer function may be a feedback path transfer function corresponding to the abnormal state of the bone conduction hearing device. The abnormal feedback path transfer function may include one or more of an incorrect wearing feedback path transfer function, an abnormal structure feedback path transfer function, a foreign body intrusion feedback path transfer function, and a foreign body blocking feedback path transfer function. In some embodiments, the abnormal feedback path may correspond to a variety of possible abnormal feedback situations. In some embodiments, the preset feedback path transfer function(s) may include feedback path transfer functions from a speaker to a microphone when the bone conduction hearing device is in different states. The different states of the bone conduction hearing device may include a state when the bone conduction hearing device is worn by the user (at this time, the speaker or the housing of the bone conduction hearing device fits the user's face) and a state when it is not worn by the user (at this time, the speaker or the housing of the bone conduction hearing device does not fit the user's face). Accordingly, the at least one preset feedback path transfer function may include a feedback path transfer function when the bone conduction hearing device is worn by the user (also known as "a first preset feedback path transfer function") and a feedback path transfer function when it is not worn by the user (also known as "a second preset feedback path transfer function").

In step 950, the feedback path transfer function may be compared with the at least one preset feedback path transfer function. Step 950 may be performed by the feedback analysis module 1030.

In some embodiments, the feedback path transfer function determined in step 930 may be compared with the at least one preset feedback path transfer function to determine the state of the bone conduction hearing device. In some embodiments, it may be determined whether a difference between the feedback path transfer function and a standard feedback function in the at least one preset feedback path transfer function is within a preset threshold range: if so, it may be determined that the feedback path transfer function is normal; If not, it may be determined that the feedback path transfer function is abnormal. In some embodiments, it may also be determined whether a ratio of the feedback path transfer function to the standard feedback function in the at least one preset feedback path transfer function is within the preset threshold range. If so, it may be determined that the feedback path transfer function is normal; If not, it may be determined that the feedback path transfer function is abnormal. In some embodiments, it may be determined whether a difference between the feedback path transfer function and an abnormal feedback function in the at least one preset feedback path transfer function is within a preset threshold range: if so, it may be determined that the feedback path transfer function is abnormal; If not, it may be determined that the feedback path transfer function is normal. In some embodiments, it may also be determined whether the ratio of the feedback path transfer function to the abnormal feedback function in the at least one preset feedback path transfer function is within the preset threshold range. If so, it may be determined that the feedback path transfer function is abnormal; If not, it may be determined that the feedback path transfer function is normal. In some embodiments, the above preset threshold range may be set manually and may be adjusted according to different situations, which is not limited in the present disclosure.

In some embodiments, if the at least one preset feedback path transfer function includes at least two preset feedback path transfer functions, the preset feedback path transfer function with a smallest difference from the feedback path transfer function may be determined as a final preset feedback path transfer function. For example, the at least one preset feedback path transfer function may include a first preset feedback path transfer function and a second preset feedback path transfer function. If a difference between the first preset feedback path transfer function and the feedback path transfer function is greater than a difference between the second preset feedback path transfer function and the feedback path transfer function, the second preset feedback path transfer function may be determined to be the final preset feedback path transfer function.

In step 960, the signal processing unit may determine the state of the bone conduction hearing device according to the comparison result. Step 960 may be performed by the signal processing module 1040.

In some embodiments, the comparison result may indicate that the feedback path transfer function is normal or abnormal. In some embodiments, if the feedback path transfer function is normal, it may be determined that the state of the bone conduction hearing device is normal; if the feedback path transfer function is abnormal, it may be determined that the state of the bone conduction hearing equipment is abnormal. In some embodiments, the state of the bone conduction hearing device may include a normal state and an abnormal state. The abnormal state may include one or more of an incorrect wearing state, an abnormal structure state, a foreign body intrusion state, and a foreign body blocking state. The wearing state refers to that the bone conduction hearing device is worn on the wearer's body. A state of off-wearing refers to that the bone conduction hearing device is not worn on the wearer's body. The normal structure state refers to that structures and/or components of the bone conduction hearing device are in a normal working state, so that the bone conduction hearing device can be used normally. The abnormal structure state may be opposite to the normal structure state, which means that the structure and/or components of the bone conduction hearing device may be in an abnormal working state (e.g., a component of the bone conduction hearing device has dislocation, movement, or damage due to collision). The foreign body intrusion state may refer to that objects other than structure and/or components of the bone conduction hearing device enter into the bone conduction hearing device. In some embodiments, the normal structure state may be classified as a normal state, and the abnormal structure state and the foreign body intrusion state may be classified as an abnormal state. In some embodiments, the comparison result may reflect the wearing state of the bone conduction hearing device, such as a wearing state and an off-wearing state.

In some embodiments, the feedback path transfer functions of the bone conduction hearing device in the normal state (e.g., a normal structure state) and the abnormal state (e.g., a foreign body intrusion state) may be determined by the method in FIG. 2, and stored in the database 130 as preset feedback path transfer functions. In some embodiments, the feedback path transfer function corresponding to the bone conduction hearing device in the abnormal state (e.g., a foreign body intrusion state) may be used as the abnormal feedback path transfer function in the at least one preset feedback path transfer function, and the feedback path transfer function corresponding to the bone conduction hearing device in the normal state (e.g., the normal structure state) may be used as the standard feedback path transfer function. In some embodiments, a plurality of preset feedback path transfer functions may be stored in the database 130, and each preset feedback path transfer function may correspond to a state (the normal state, the abnormal state) of the bone conduction hearing device. According to steps 950 and 960, by comparing the current feedback path transfer function of the bone conduction hearing device with the at least one preset feedback path transfer function in the database 130, the preset feedback path transfer function in the database 130 that is closest to the current feedback path transfer function of the bone conduction hearing device may be matched. Then the state of the bone conduction hearing device corresponding to a matching preset feedback path transfer function may be the current state of the bone conduction hearing device. Therefore, according to the process described above, the current state of the bone conduction hearing device may be determined in real time.

In some embodiments, the comparison result may be used to identify different types of the at least one preset feedback path transfer function, thereby determining different states of the bone conduction hearing device. In some embodiments, the types of the at least one preset feedback path transfer function may include a standard feedback path transfer function and an abnormal feedback path transfer function. The abnormal feedback path transfer function may include one or more of an incorrect wearing feedback path transfer function, an abnormal structure feedback path transfer function, a foreign body intrusion feedback path transfer function, and a foreign body blocking feedback path transfer function. According to the types of one or more preset feedback path transfer functions whose differences or ratio with respect to the feedback path transfer function are within the preset threshold range, a type of the feedback path transfer function may be determined, and then the state of the bone conduction hearing device may be determined. For example, if it is determined that the type of the preset feedback path transfer function corresponds to the tight fitting state (that is, the bone conduction hearing device fits tightly with the user), the type of the feedback path transfer function may also correspond to the tight fitting state, which may reflect that the bone conduction hearing device fits tightly with the user. As another example, if it is determined that the type of the preset feedback path transfer function is the loose fitting state, the type of the feedback path transfer function may also be the loose fitting. Accordingly, it may reflect that the bone conduction hearing device is not tight with the user. As another example, different preset feedback path transfer functions may correspond to different parts of the head worn by the bone conduction hearing device. If the type of the preset feedback path transfer function determined corresponds to a certain part of the head (e.g., at a mastoid process, a temporal bone, or the forehead), the type of the feedback path transfer function may also correspond to the head part. Accordingly, it may reflect a position of the bone conduction hearing device worn by the user at the head (e.g., at the mastoid process, the temporal bone, or the forehead).

In some embodiments, after determining the state of the bone conduction hearing device, the signal processing module 1040 may adaptively adjust one or more parameters of the bone conduction hearing device. In some embodiments, after determining the state of the bone conduction hearing device, the signal processing module 1040 may also send reminder information to the user indicating the above determined state. In some embodiments, if the state of the bone conduction hearing device is abnormal, the user may be reminded to adjust the state of the bone conduction hearing device. In some embodiments, methods of reminding the user may include but be not limited to a voice prompt, a prompt lamp prompt, a vibration prompt, a text prompt, a remote message, etc. Specifically, the voice prompt may be voice a message sent by the bone conduction hearing device, for example, "foreign body is intruded into the device." The bone conduction hearing device may be equipped with a prompt light. When the bone conduction hearing device is in the normal state, the prompt light may display a green light, and when the bone conduction hearing device is in the abnormal state, the prompt light may display a red light to remind the wearer. When the state of the bone conduction hearing device is abnormal, the bone conduction hearing device will produce vibrations, for example, vibration 3 times may indicate the bone conduction hearing device has an abnormal structure; continuous vibration may indicate intrusion of foreign body. The text prompt may refer to a text message displayed on the bone conduction hearing device or a terminal communicating and/or connected with the bone conduction hearing device to remind the user, such as "foreign body is intruded into the device" and "the device has an abnormal structure."

It should be noted that the above description is provided for illustrative purposes only and is not intended to limit the scope of the present disclosure. For those skilled in the art, many changes and modifications can be made under the guidance of the content of the present disclosure. The features, structures, methods, and other features of the exemplary embodiments described herein may be combined in various ways to obtain additional and/or alternative exemplary embodiments. For example, there may be multiple states of the bone conduction hearing device, but which states belong to the normal state and which states belong to the abnormal state can be set by the operator according to experience, by the user, or by the signal processing module 1040. However, these changes and modifications will not deviate from the scope of the present disclosure.

Figure 10:
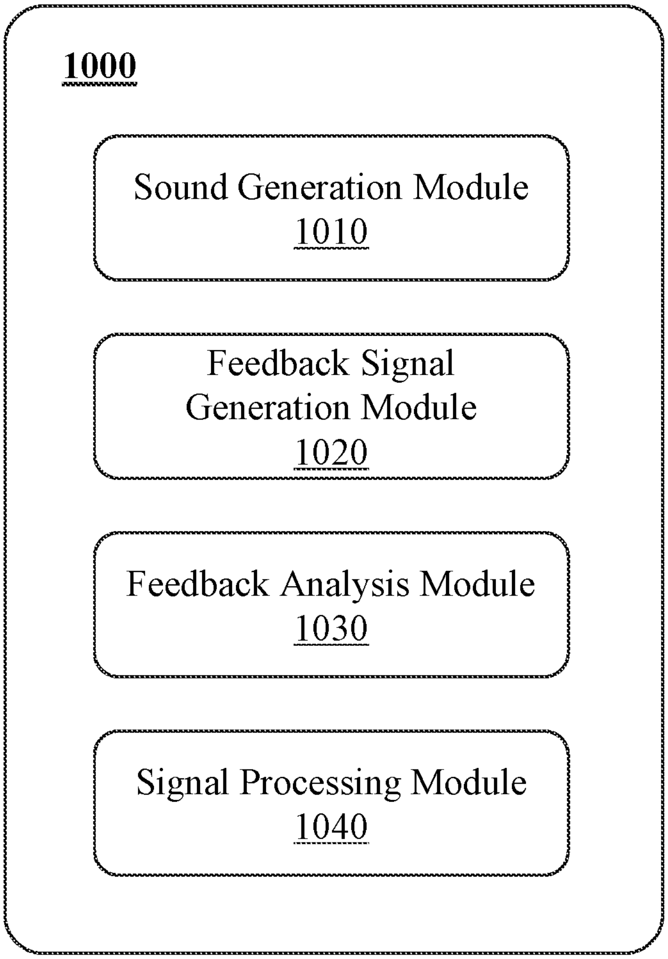
FIG. 10 is an exemplary module diagram of a system for detecting a state of a bone conduction hearing device according to some embodiments of the present disclosure.

FIG. 10 is an exemplary module diagram of a system for detecting a state of a bone conduction hearing device according to some embodiments of the present disclosure. A detection system 1000 of bone conduction hearing device states can be referred to as a system 1000 for short. As shown in FIG. 10, in some embodiments, the system 1000 may include a sound generation module 1010, a feedback signal generation module 1020, a feedback analysis module 1030, and a signal processing module 1040.

The sound generation module 1010 may be configured to generate the third sound based on the first signal. The first signal may be generated by the signal processing unit. In some embodiments, the sound generation module 1010 may be the bone conduction speaker or part of the bone conduction speaker. For more information about generating the third sound based on the first signal, please refer to detailed descriptions in FIG. 9, which will not be repeated here.

The feedback signal generation module 1020 may be configured to receive the third sound and generate a feedback signal. In some embodiments, the feedback signal generation module 1020 may be a microphone or part of a microphone, or any acoustoelectric sensor or vibration sensor. For more information about generating the feedback signal, please refer to the detailed description in FIG. 9, which may not be repeated here.

The feedback analysis module 1030 may be configured to determine the feedback path transfer function from the speaker of the bone conduction hearing device to the microphone based on the feedback signal and the first signal. The feedback analysis module 1030 may also be configured to obtain at least one preset feedback path transfer function. In addition, the feedback analysis module 1030 may also be configured to compare the feedback path transfer function with the at least one preset feedback path transfer function. For more information about determining the feedback path transfer function, comparing the feedback path transfer function and the at least one preset feedback path transfer function, please refer to the detailed descriptions in FIG. 9, which will not be repeated here.

The signal processing module 1040 may be configured to determine the state of the bone conduction hearing device according to the comparison result. For more information about determining the state of the bone conduction hearing device, please refer to the detailed description in FIG. 9, which will not be repeated here.

In some embodiments of the present disclosure, a computer-readable storage medium may be also provided. The storage medium stores computer instructions. When a computer reads the computer instructions in the storage medium, the computer may execute: generating the third sound based on the first signal, wherein the first signal may be a test signal generated by the computer; receiving the third sound and generating a feedback signal; determining a feedback path transfer function from the speaker of the bone conduction hearing device to the microphone based on the feedback signal and the first signal; obtaining at least one preset feedback path transfer function; comparing the feedback path transfer function with at least one preset feedback path transfer function; determining the state of the bone conduction hearing device according to the comparison result.

It should be noted that the above description of the system and its devices/modules is only for the convenience of description, and cannot limit the application to the scope of the cited embodiments. It can be understood that for those skilled in the art, after understanding the principle of the system, they may make any combination of various devices/modules, or form a subsystem to connect with other devices/modules without departing from this principle. For example, the feedback analysis module 1030 and the signal processing module 1040 disclosed in FIG. 10 may be different modules in one device (e.g., the processor 140), or one module may realize functions of two or more modules described above. For example, the feedback analysis module 1030 and the signal processing module 1040 may be two modules, or one module with functions of analyzing and processing signals at the same time. As another example, each module may have its own storage module. As another example, each module may share a storage module. Such modifications are within the scope of protection of the present disclosure.

The possible beneficial effects of the embodiment of the present disclosure include but are not limited to: (1) the vibration transfer function of the bone conduction speaker can be measured without using external devices such as accelerometers, making the test process more simple and convenient; (2) the current state of the bone conduction hearing device can be detected according to the feedback path transfer function, and corresponding reminders may be sent to the user according to the state of the bone conduction hearing device, so that the user can know or adjust the state of the bone conduction hearing device, so as to improve user experience. It should be noted that different embodiments may produce different beneficial effects. In different embodiments, possible beneficial effects can be any one or a combination of the above, or any other possible beneficial effects.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Meanwhile, certain terminology has been used to describe embodiments of the present disclosure. For example, the terms “one embodiment,” “an embodiment,” and/or “some embodiments” mean that a particular feature, structure, or characteristic described in connection with the embodiment is included in at least one embodiment of the present disclosure. Therefore, it is emphasized and should be appreciated that two or more references to “an embodiment” or “one embodiment” or “an alternative embodiment” in various portions of this specification are not necessarily all referring to the same embodiment. Furthermore, the particular features, structures, or characteristics may be combined as suitable in one or more embodiments of the present disclosure.

In addition, unless expressly stated in the claims, the order of processing elements and sequences, the use of numbers and letters, or the use of other names described in the application is not used to limit the order of the processes and methods of the present disclosure. Although some embodiments of the present disclosure that are currently considered useful are discussed through various examples in the above disclosure, it should be understood that such details are only for the purpose of explanation, and the additional claims are not limited to the disclosed embodiments. On the contrary, the claims are intended to cover all amendments and equivalent combinations that conform to the essence and scope of the embodiments of the present disclosure. For example, although the system components described above can be implemented by hardware devices, they can also be implemented only by software solutions, such as installing the described system on existing servers or mobile devices.

Similarly, it should be noted that in order to simplify the expression disclosed in the present disclosure and thus help the understanding of one or more embodiments of the invention, the foregoing description of the embodiments of the present disclosure sometimes incorporates a variety of features into one embodiment, the accompanying drawings or the description thereof. However, this disclosure method does not mean that the object of the present disclosure requires more features than those mentioned in the claims. In fact, the features of the embodiment are less than all the features of the single embodiment disclosed above.

Finally, it should be understood that the embodiments described in the present disclosure merely illustrate the principles of the embodiments of the present disclosure. Other modifications may be within the scope of the present disclosure. Accordingly, by way of example, and not limitation, alternative configurations of embodiments of the present disclosure may be considered to be consistent with the teachings of the present disclosure. Accordingly, the embodiments of the present disclosure are not limited to the embodiments explicitly introduced and described by the present disclosure.

What is claimed is:

1. A method for detecting the state of a bone conduction hearing device, wherein the bone conduction hearing device comprises at least a microphone, a speaker, a feedback analysis unit, and a signal processing unit, and the method comprises:

generating, by the speaker, a third sound based on a first signal, wherein the first signal is generated by the signal processing unit;

by the microphone, receiving the third sound and generating a feedback signal;

by the feedback analysis unit, determining a feedback path transfer function from the speaker to the microphone based on the feedback signal and the first signal; obtaining at least one preset feedback path transfer function; and comparing the feedback path transfer function with the at least one preset feedback path transfer function; and determining, by the signal processing unit, the state of the bone conduction hearing device based on a comparison result, wherein the at least one preset feedback path transfer function includes a standard feedback path transfer function and an abnormal feedback path transfer function, the abnormal feedback path transfer function includes one or more of an incorrect wearing feedback path transfer function, an abnormal structure feedback path transfer function, a foreign body intrusion feedback path transfer function, and a foreign body blocking feedback path transfer function;

the comparing the feedback path transfer function with the at least one preset feedback path transfer function comprises:

determining, from the at least one preset feedback path transfer function, at least one preset feedback path transfer function whose difference from the feedback path transfer function is within a preset threshold range; and determining a type of the feedback path transfer function based on a type of the at least one determined preset feedback path transfer function.

2. The method of claim 1, wherein the determining a type of the feedback path transfer function based on a type of the at least one determined preset feedback path transfer function comprises:

if the type of the at least one determined preset feedback path transfer function is the standard feedback path transfer function, determining that the feedback path transfer function is a normal feedback path transfer function; or if the type of the at least one determined preset feedback path transfer function is the abnormal feedback path transfer function, determining that the feedback path transfer function is an abnormal feedback path transfer function;

and the method further comprises:

if the type of the at least one determined preset feedback path transfer function is the incorrect wearing feedback path transfer function, determining that the feedback path transfer function is an incorrect wearing feedback path transfer function; or if the type of the at least one determined preset feedback path transfer function is the abnormal structure feedback path transfer function, determining that the feedback path transfer function is an abnormal structure feedback path transfer function; or if the type of the at least one determined preset feedback path transfer function is the foreign body intrusion feedback path transfer function, determining that the feedback path transfer function is a foreign body intrusion feedback path transfer function; or if the type of the at least one determined preset feedback path transfer function is the foreign body blocking feedback path transfer function, determining that the feedback path transfer function is a foreign body blocking feedback path transfer function.

3. The method of claim 2, wherein the determining the state of the bone conduction hearing device based on a comparison result comprises:

if the feedback path transfer function is a normal feedback path transfer function, determining that the state of the bone conduction hearing device is normal; or if the feedback path transfer function is an abnormal feedback path transfer function, determining that the state of the bone conduction hearing device is abnormal, and the method further comprises determining an abnormal type of the bone conduction hearing device by:

if the feedback path transfer function is an incorrect wearing feedback path transfer function, determining that the bone conduction hearing device is in an incorrect wearing state; or if the feedback path transfer function is an abnormal structure feedback path transfer function, determining that the bone conduction hearing device is in an abnormal structure state; or if the feedback path transfer function is a foreign body intrusion feedback path transfer function, determining that the bone conduction hearing device is in a foreign body intrusion state; or if the feedback path transfer function is a foreign body blocking feedback path transfer function, determining that the bone conduction hearing device is in a foreign body blocking state.

4. The method of claim 1, wherein the determining, from the at least one preset feedback path transfer function, at least one preset feedback path transfer function whose difference from the feedback path transfer function is within a preset threshold range comprises:

if the count of the at least one determined preset feedback path transfer function is two or more than two, determining the preset feedback path transfer function with the smallest difference as one determined preset feedback path transfer function.

5. The method of claim 1, wherein the method further comprises:

adaptively adjusting one or more parameters of the bone conduction hearing device or sending reminder information to a user based on the state of the bone conduction hearing device.

6. The method of claim 1, wherein the state of the bone conduction hearing device includes a normal state and an abnormal state; and the abnormal state includes one or more of an incorrect wearing state, an abnormal structure state, a foreign body intrusion state, and a foreign body blocking state.

7. The method of claim 1, wherein the determining a feedback path transfer function from the speaker to the microphone based on the feedback signal and the first signal comprises:

generating a first transformed signal by transforming the first signal;

generating a transformed feedback signal by transforming the feedback signal; and determining the feedback path transfer function based on the first transformed signal and the transformed feedback signal.

8. A system for detecting the state of a bone conduction hearing device, wherein the bone conduction hearing device comprises at least a microphone, a speaker, a feedback analysis unit, and a signal processing unit, and the system comprises:

the speaker configured to generate a third sound based on a first signal, wherein the first signal is generated by the signal processing unit;

the microphone configured to receive the third sound and generate a feedback signal;

the feedback analysis unit configured to: determine a feedback path transfer function from the speaker to the microphone based on the feedback signal and the first signal; obtain at least one preset feedback path transfer function; compare the feedback path transfer function with the at least one preset feedback path transfer function; and the signal processing unit configured to determine the state of the bone conduction hearing device based on a comparison result, wherein the at least one preset feedback path transfer function includes a standard feedback path transfer function and an abnormal feedback path transfer function, the abnormal feedback path transfer function includes one or more of an incorrect wearing feedback path transmission function, an abnormal structure feedback path transfer function, a foreign body intrusion feedback path transfer function, and a foreign body blocking feedback path transfer function;

to compare the feedback path transfer function with the at least one preset feedback path transfer function, the feedback analysis unit is configured to:

determine, from the at least one preset feedback path transfer function, at least one preset feedback path transfer function whose difference from the feedback path transfer function are within a preset threshold range; and determine a type of the feedback path transfer function based on a type of the at least one determined preset feedback path transfer function.

9. The system of claim 8, wherein the determining a type of the feedback path transfer function based on a type of the at least one determined preset feedback path transfer function comprises:

if the type of the at least one determined preset feedback path transfer function is the standard feedback path transfer function, determining that the feedback path transfer function is a normal feedback path transfer function; or if the type of the at least one determined preset feedback path transfer function is the abnormal feedback path transfer function, determining that the feedback path transfer function is an abnormal feedback path transfer function;

and the determining a type of the feedback path transfer function further comprises:

if the type of the at least one determined preset feedback path transfer function is the incorrect wearing feedback path transfer function, determining that the feedback path transfer function is an incorrect wearing feedback path transfer function; or if the type of the at least one determined preset feedback path transfer function is the abnormal structure feedback path transfer function, determining that the feedback path transfer function is an abnormal structure feedback path transfer function; or if the type of the at least one determined preset feedback path transfer function is the foreign body intrusion feedback path transfer function, determining that the feedback path transfer function is a foreign body intrusion feedback path transfer function; or if the type of the at least one determined preset feedback path transfer function is the foreign body blocking feedback path transfer function, determining that the feedback path transfer function is a foreign body blocking feedback path transfer function.

10. The system of claim 9, wherein the determining the state of the bone conduction hearing device based on a comparison result comprises:

if the feedback path transfer function is a normal feedback path transfer function, determining that the state of the bone conduction hearing device is normal; or if the feedback path transfer function is an abnormal feedback path transfer function, determining that the state of the bone conduction hearing device is abnormal; and the system further comprises determining an abnormal type of the bone conduction hearing device by:

if the feedback path transfer function is an incorrect wearing feedback path transfer function, determining that the bone conduction hearing device is in an incorrect wearing state; or if the feedback path transfer function is an abnormal structure feedback path transfer function, determining that the bone conduction hearing device is in an abnormal structure state; or if the feedback path transfer function is a foreign body intrusion feedback path transfer function, determining that the bone conduction hearing device is in a foreign body intrusion state; or if the feedback path transfer function is a foreign body blocking feedback path transfer function, determining that the bone conduction hearing device is in a foreign body blocking state.

11. The system of claim 10, wherein the signal processing unit is configured to adaptively adjust one or more parameters of the bone conduction hearing device or send reminder information to a user based on the state of the bone conduction hearing device.

12. The system of claim 8, wherein the determining, from the at least one preset feedback path transfer function, at least one preset feedback path transfer function whose difference from the feedback path transfer function are within a preset threshold range comprises:

if the count of the at least one determined preset feedback path transfer function is two or more than two, determining the preset feedback path transfer function with the smallest difference as one determined preset feedback path transfer function.

13. The system of claim 8, wherein the state of the bone conduction hearing device includes a normal state and an abnormal state; and the abnormal state includes one or more of an incorrect wearing state, an abnormal structure state, a foreign body intrusion state, and a foreign body blocking state.

14. The system of claim 8, wherein the determining a feedback path transfer function from the speaker to the microphone based on the feedback signal and the first signal comprises:

generating a first transformed signal by transforming the first signal;

generating a transformed feedback signal by transforming the feedback signal; and determining the feedback path transfer function based on the first transformed signal and the transformed feedback signal.

15. A system for detecting the state of a bone conduction hearing device, wherein the system comprises a sound generation module, a feedback signal generation module, a feedback analysis module, and a signal processing module; wherein the sound generation module is configured to generate a third sound based on a first signal, wherein the first signal is generated by a signal processing unit;

the feedback signal generation module is configured to receive the third sound and generate a feedback signal;

the feedback analysis module is configured to determine a feedback path transfer function from the speaker to the microphone based on the feedback signal and the first signal; obtain at least one preset feedback path transfer function; and compare the feedback path transfer function and the at least one preset feedback path transfer function; and the signal processing module is configured to determine the state of the bone conduction hearing device based on a comparison result, wherein the at least one preset feedback path transfer function includes a standard feedback path transfer function and an abnormal feedback path transfer function, the abnormal feedback path transfer function includes one or more of an incorrect wearing feedback path transmission function, an abnormal structure feedback path transfer function, a foreign body intrusion feedback path transfer function, and a foreign body blocking feedback path transfer function;

to compare the feedback path transfer function with the at least one preset feedback path transfer function, the feedback analysis module is configured to:

determine, from the at least one preset feedback path transfer function, at least one preset feedback path transfer function whose difference from the feedback path transfer function are within a preset threshold range; and determine a type of the feedback path transfer function based on a type of the at least one determined preset feedback path transfer function.

16. The system of claim 15, wherein to determine a feedback path transfer function from the speaker to the microphone, the feedback analysis module is configured to:

generate a first transformed signal by transforming the first signal;

generate a transformed feedback signal by transforming the feedback signal; and determine the feedback path transfer function based on the first transformed signal and the transformed feedback signal.

* * * * *